(12) United States Patent
Fujita et al.

(10) Patent No.: US 6,172,589 B1
(45) Date of Patent: Jan. 9, 2001

(54) HARD MAGNETIC ALLOY HAVING SUPERCOOLED LIQUID REGION, SINTERED OR CAST PRODUCT THEREOF OR STEPPING MOTOR AND SPEAKER USING THE ALLOY

(75) Inventors: Kouichi Fujita, Miyagi-ken; Akihiro Makino, Niigata-ken; Akihisa Inoue, Miyagiken, all of (JP)

(73) Assignees: Alps Electric Co., Ltd., Tokyo; Akihisa Inoue, Miyagi-ken, both of (JP)

( * ) Notice: Under 35 U.S.C. 154(b), the term of this patent shall be extended for 0 days.

(21) Appl. No.: 09/138,149

(22) Filed: Aug. 21, 1998

(30) Foreign Application Priority Data

| | | |
|---|---|---|
| Aug. 22, 1997 | (JP) | 9-226867 |
| Aug. 28, 1997 | (JP) | 9-233068 |
| Aug. 29, 1997 | (JP) | 9-235289 |
| Aug. 29, 1997 | (JP) | 9-235290 |
| Aug. 29, 1997 | (JP) | 9-249931 |
| Aug. 29, 1997 | (JP) | 9-249935 |

(51) Int. Cl.$^7$ ............................................. H01F 7/02
(52) U.S. Cl. .................................. 335/306; 335/302
(58) Field of Search ................................ 145/104, 304, 145/101, 538; 335/302–6

(56) References Cited

U.S. PATENT DOCUMENTS

| | | | |
|---|---|---|---|
| 5,172,751 | * 12/1992 | Croat | 148/101 |
| 5,725,684 | * 3/1998 | Inoue et al. | 148/304 |
| 5,976,274 | * 11/1999 | Inoue et al. | 148/304 |

FOREIGN PATENT DOCUMENTS

| | | |
|---|---|---|
| 0 542 529 A1 | 5/1993 | (JP) . |
| 06124820A | 5/1994 | (JP) . |
| 06124825A | 5/1994 | (JP) . |
| 0 632 471 A2 | 1/1995 | (JP) . |
| 0 867 897 | 9/1998 | (JP) . |

OTHER PUBLICATIONS

Koji Ma A et al. "Structural and Magnetic Properties of Nanocrystalline Fe–Rich Fe–Nb–Nd–B Sintered Magnets Produced By Consolidating Amorphous Powders" IEEE Transactions On Magnetics, vol. 33, No. 5, part 02, Sep. 1997, pp. 3817–3819; XP000703227 Intermag Conference, New Orleans Apr. 1997.

Patent Abstracts of Japan, vol. 016, No. 423 (E–1260), Sep. 7, 1992 & JP 04 147605A (Hitachi Metals Ltd), May 21, 1992.

Abstract, Database WPI,Section Ch, Week 9536, Derwent Publications ltd., London, GB; Class L03, AN 95–273107 XP002092150 & JP 07 173501 A (Sumitomo Special Metals Co Ltd), Jul. 11, 1995.

* cited by examiner

*Primary Examiner*—Lincoln Donovan
(74) *Attorney, Agent, or Firm*—Brinks Hofer Gilson & Lione

(57) ABSTRACT

A hard magnetic alloy obtained by heat treatment, at a heating rate of 20° C./min or more, of a glassy alloy containing Fe as a main component, at least one element R selected from the rare earth elements, at least one selected from Ti, Zr, Hf, V, Nb, Ta, Cr, Mo, W, and Cu, and B, and having a supercooled liquid region having a temperature width $\Delta Tx$ of 20° C. or more, which is represented by the equation $\Delta Tx = Tx - Tg$ (wherein Tx indicates the crystallization temperature, and Tg indicates the glass transition temperature), and a sintered compact, a cast magnet, a stepping motor and a speaker each of which includes the hard magnetic alloy.

16 Claims, 20 Drawing Sheets

HARD MAGNETIC ALLOY HAVING SUPERCOOLED LIQUID REGION, SINTERED OR CAST PRODUCT THEREOF OR STEPPING MOTOR AND SPEAKER USING THE ALLOY

BACKGROUND OF THE INVENTION

1. Field of the Invention

The present invention relates to a hard magnetic alloy having a supercooled liquid region, and particularly to a hard magnetic alloy which has excellent hard magnetism at room temperature and which can be formed to a bulk permanent magnet comprising a sintered or cast product. The present invention also relates to a stepping motor and a speaker using the hard magnetic alloy.

2. Description of the Related Art

Some types of multi-element alloys are conventionally known to have a wide supercooled liquid region before crystallization and constitute glassy alloys. It is also known that such glassy alloys can be formed to bulk alloys significantly thicker than amorphous alloy ribbons produced by a conventional known liquid quenching method.

Examples of conventional known amorphous alloy ribbons include ribbons of Fe—P—C system amorphous alloys first produced in the 1960's, (Fe,Co,Ni)—P—B system and (Fe,Co,Ni)—Si—B system alloys produced in the 1970's, and (Fe,Co,Ni)—M (Zr,Hf,Nb) system alloys and (Fe,Co,Ni)—M (Zr,Hf,Nb)—B system alloys produced in the 1980's. All these alloys must be produced by quenching at a cooling rate in the $10^{-5°}$ C./s level, and the produced ribbons have a thickness of 50 μm or less.

On the other hand, glassy alloys having a thickness of several millimeters are obtained, and such glassy alloys include alloys having the Ln—Al—TM, Mg—Ln—TM and Zr—Al—TM (wherein Ln represents a rare earth element, and TM represents a transition metal) system compositions and the like, which were discovered in 1988 to 1991.

However, all these conventional known glassy alloys have no magnetism at room temperature, and from this viewpoint, these alloys are industrially greatly restricted when considered as hard magnetic materials.

Therefore, if a thick alloy comprising an amorphous single phase is obtained, the crystal structure is made fine and uniform after heat treatment, and good magnetic properties are expected. Therefore, research and development have conventionally proceeded with respect to glass alloys having hard magnetism at room temperature and permitting the formation of thick bulk products. These alloys having various compositions exhibit a supercooled liquid crystal liquid state at room temperature, but the temperature width ΔTx of the supercooled liquid region, i.e., the difference (Tx-Tg) between the crystallization temperature (Tx) and the glass transition temperature (Tg), is generally small. Therefore, in fact, such alloys have the low ability to form glassy alloys, and are thus unpractical. In consideration of this, the presence of an alloy having a supercooled liquid region having a wide temperature width, and capable of forming a glassy alloy by cooling overcomes thickness restrictions of conventional known amorphous alloy ribbons, and such an alloy thus attracts much attention in the metallurgical field. However, whether or not such an alloy can be developed as an industrial material depends upon the finding of a glassy alloy exhibiting ferromagnetism at room temperature.

Also examples of conventional known magnet materials having performance superior to ferrite magnets include Sm—Co sintered magnets, Fe—Nd—B sintered magnets, Fe—Nd—B quenched magnets, and the like. In order to achieve higher performance, there are many researches on new alloy magnets such as Fe—Sm—N magnets.

However, these magnet materials must contain 10 atomic % or more of Nd or 8 atomic % or more of Sm, and thus have the drawback that the production cost is higher than the ferrite magnets because a large amount of expensive rare earth element is used. The ferrite magnets are produced at lower cost than these rare earth magnets, but have insufficient magnetic properties. Therefore, there is demand for appearance of a magnet material costing less and exhibiting hard magnetism higher than ferrite magnets.

On the other hand, as a magnet generally known as a "bonded magnet", a magnet formed by compression molding or injection molding a mixture of a magnetic powder and a rubber or plastic binder can widely be used as electronic parts because of high shape freedom, but has the problems of low magnetic performance due to low remanent magnetization, and low material strength because of inclusion of the binder.

Possible applications of these magnets include a stepping motor and a speaker.

The stepping motor is a special motor in which the rotation can be arbitrarily controlled by a pulse current. Therefore, the stepping motor requires no feedback control, is capable of positioning in an open loop, and used as a drive source in a positioning control system in various fields. Particularly, since a hybrid stepping motor has high rotational torque and is small and capable of performing precise positioning control, the hybrid stepping motor is used as a drive source for a driving mechanism in a copying machine, a computer, or the like.

The characteristics of a hard magnetic alloy are represented by the second quadrants of hysteresis curves, i.e., demagnetization curves. After magnetization, a hard magnetic alloy is under the reverse magnetic field, i.e., the diamagnetic field, produced by its remanent magnetization, and thus the operating point (the magnetic flux density (B) and demagnetizing field (H) of a material) is represented by a point p on the demagnetization curve thereof. At this point, the product (BH) represents the maximum energy product $((BH)_{max})$.

In order to increase the rotational torque of the stepping motor, it is important to use a hard magnetic alloy having the high maximum energy product $((BH)_{max})$.

Since the rotational torque of the stepping motor is proportional to the product of the current passing through the stepping motor and the energy (U) of the magnetostatic field produced outside by a hard magnetic alloy, the rotational torque of the stepping motor is increased by increasing the maximum energy product $((BH)_{max})$.

In order to increase the maximum energy product $((BH)_{max})$ of a hard magnetic alloy, it is necessary to made the shape of a demagnetization curve angular to increase the area surrounded by the demagnetization curve, the magnetic field axis and the magnetization axis. Namely, it is necessary to increase the remanence ratio (Ir/Is) to increase remanent magnetization (Ir) and coercive force (iHc).

Therefore, as a hard magnetic alloy used for a rotor of a HB type motor, a Al—Ni—Co—Fe system magnet, a Nd—Fe—B system sintered magnet, a Nd—Fe—B type bonded magnet, a Sm—Co system sintered magnet, or the like is used.

However, in a stepping motor using a Al—Ni—Co—Fe system magnet, since the Al—Ni—Co—Fe system magnet has a coercive force (iHc) of as low as 1 kOe or less, there is the problem of causing difficulties in attempting to decease the size of the stepping motor.

Although a Nd—Fe—B system sintered magnet and Sm—Co system sintered magnet have high coercive force (iHc) and are thus used for some of small stepping motors, these magnets have the need to sinter a material powder in the production process, and thus have the problem of increasing the production cost of a magnet, thereby increasing the production cost of a stepping motor.

Furthermore, a Nd—Fe—B system bonded magnet is produced by mixing a rubber or plastic binder with a magnetic powder formed by liquid quenching of an alloy melt mainly comprising the $Nd_2Fe_{14}B$ phase or a $Fe_3B$—$Nd_2Fe_{14}$ system exchange spring magnetic powder and then compressing molding or injection molding, and thus has low material strength because of inclusion of the binder. There is thus a problem in that the rotor of a stepping motor serving as a driving unit has low strength.

Also, from the viewpoint of material strength, a ribbon having a thickness of about 50 μm or less and obtained by quenching a melt of a Nd—Fe—B system alloy is preferable from the viewpoint of mechanical strength. However, in the use of such a hard magnetic alloy ribbon as the rotor of a stepping motor, many ribbons must be laminated, thereby causing the problem of increasing the production cost of the stepping motor.

A conventional known speaker schematically comprises a pole piece made of iron, a cylindrical yoke provided on the outside of the pole piece with a space therebetween, upper and lower speaker magnet rings provided in the space between the pole piece and the yoke, and a conical diaphragm. In addition, a voice coil is provided in the magnetic gap formed by the speaker magnets, the voice coil being connected to the conical diaphragm. In such a speaker, when a voice current flows from an amplifier to the voice coil, motion accordingly occurs to move the conical diaphragm connected to the voice coil so that sounds can be emitted.

In a conventional speaker, a ferrite magnet or a Al—Ni—Co—Fe system magnet is used as a speaker magnet material, and a Nd—Fe—B system magnet or a Sm—Co system magnet is used as a magnet material having performance superior to the ferrite magnet and Al—Ni—Co—Fe system magnet. Furthermore, many researches have been made for achieving higher performance by using new alloy magnets such as a Sm—Fe—N system alloy and the like.

However, as described above, the Nd—Fe—B system magnet, the Sm—Co system magnet and the Sm—Fe—N system magnet require 10 atomic % or more of Nd or 8 atomic % or more of Sm, and thus have a fault that the production cost is higher than a ferrite magnet and Al—Ni—Co—Fe system magnet because a large amount of expensive rare earth element is used. In addition, the Sm—Co system magnet is a more expensive magnet than the Nd—Fe—B system magnet, and is thus impractical. On the other hand, the Al—Ni—Co—Fe system magnet costs less than a rare earth magnet, but has the problem of excessively low coercive force. There is thus demand for appearance of a speaker magnet material which costs less and has higher hard magnetic properties than a ferrite magnet.

SUMMARY OF THE INVENTION

Accordingly, a first object of the present invention is to provide a hard magnetic alloy which has a supercooled liquid region having a wide temperature width ΔTx, excellent hard magnetism at room temperature, and excellent strength as a material, and which can be formed to a thicker shape than an amorphous alloy ribbon obtained by a conventional liquid quenching method.

A second object of the present invention is to provide a hard magnetic alloy molding having excellent strength as a material and excellent magnetic performance.

A third object of the present invention is to provide a cast magnet, which has excellent material strength and magnetic performance and high shape freedom, and which can be used as a permanent magnet member.

A fourth object of the present invention is to provide a stepping motor which permits miniaturization, which comprises a rotor having high strength, and which can be produced at low cost.

A fifth object of the present invention is to obtain a hard magnetic alloy which has a supercooled liquid region having a wide temperature width ΔTx, excellent hard magnetism at room temperature, and excellent strength as a material, which can be formed to a thicker shape than an amorphous alloy ribbon obtained by a conventional liquid quenching method, and which costs less than a rare earth magnet, and to provide a speaker using the hard magnetic alloy as a speaker magnet material.

The hard magnetic alloy having a supercooled liquid region according to the present invention is obtained by heat treatment of a glassy alloy at a heating rate of 20° C./min or more, wherein the glassy alloy comprises Fe as a main component, at least one element R selected from the rare earth elements, at least one element M selected from Ti, Zr, Hf, V, Nb, Ta, Cr, Mo, W and Cu, and B, and has a supercooled liquid region having a temperature width ΔTx of 20° C. or more represented by the equation ΔTx=Tx−Tg (wherein Tx is the crystallization temperature, and Tg is the glass transition temperature).

The hard magnetic alloy having a supercooled liquid region according to the present invention may be represented by the following formula:

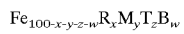
$Fe_{100-x-y-z-w}R_xM_yT_zB_w$ wherein T is at least one element selected from Co and Ni, and the composition ratios x, Y, Z, and w by atomic % satisfy 2 atomic %≦x≦15 atomic %, 2 atomic %≦y≦20 atomic %, 0≦z≦20 atomic %, and 10 atomic %≦w≦30 atomic %, respectively.

The hard magnetic alloy having a supercooled liquid region according to the present invention may be represented by the following formula:

$Fe_{100-x-y-z-w-t}R_xM_yT_zB_wL_t$ wherein T is at least one element selected from Co and Ni, the composition ratios x, Y, Z, w and t by atomic % satisfy 2 atomic %≦x≦15 atomic %, 2 atomic %≦y≦20 atomic %, 0≦z≦20 atomic %, 10 atomic %≦w≦30 atomic %, and 0≦t≦5 atomic %, respectively, and L is at least one element selected from Ru, Rh, Pd, Os, Ir, Pt, Al, Si, Ge, Ga, Sn, C and P.

In the present invention, the hard magnetic alloy subjected to heat treatment may comprise a crystalline phase composed of at least one of a α-Fe phase and $Fe_3B$ phase, and a crystalline phase composed of a $Nd_2Fe_{14}B$ phase, both of which are precipitated.

In the present invention, even if the hard magnetic alloy contains small amounts of impurities inevitable in the production process, for example, rare earth oxides, and the like, it can be considered as lying within the scope of the technical idea of the hard magnetic alloy of the present invention.

In order to achieve the objects, the present invention provides a hard magnetic alloy sintered compact obtained by sintering, under heat and pressure, a glassy alloy powder comprising Fe as a base metal, at least one rare earth element R, at least one metal M selected from Ti, Zr, Hf, V, Nb, Ta, Cr, Mo, W and Cu, and B, and having a supercooled liquid region having a temperature width ΔTx of 20° C. or more represented by the equation ΔTx=Tx−Tg (wherein Tx is the crystallization temperature, and Tg is the glass transition temperature), and at the same time, imparting magnetic anisotropy to the glassy alloy powder.

The glassy alloy preferably has the composition represented by the following formula (1):

$$Fe_{100-x-y-z-w}R_xM_yT_zB_w \quad \text{Formula (1)}$$

wherein R is the rare earth element, T is at least one element selected from Co and Ni, and the composition ratios x, Y, Z and w by atomic % satisfy 2 atomic %≦x≦15 atomic %, 2 atomic %≦y≦20 atomic %, 0≦z≦20 atomic %, and 10 atomic %≦w≦30 atomic %, respectively. Also element L (at least one element selected from Ru, Rh, Pd, Os, Ir, Pt, Al, Si, Ge, Ga, Sn, C and P) may be added up to an upper limit of 5 atomic %.

In production of the hard magnetic alloy sintered compact, the present invention also provides a method of producing the hard magnetic alloy sintered compact comprising sintering molding the glassy alloy under heat and pressure by a spark plasma sintering process, and at the same time imparting magnetic anisotropy to the glassy alloy powder. At this time, the sintering temperature Ts is preferably in the range of the crystallization temperature Tx±250 (K), and the sintering pressure is preferably in the range of 200 to 1500 MPa.

In order to achieve the objects, the present invention provides a cast magnet obtained by casting a glassy alloy composition comprising Fe as a base metal, at least one rare earth element R, at least one metal M selected from Ti, Zr, Hf, V, Nb, Ta, Cr, Mo, W and Cu, and B, and having a supercooled liquid region having a temperature width ΔTx of 20° C. or more represented by the equation ΔTx=Tx−Tg (wherein Tx is the crystallization temperature, and Tg is the glass transition temperature), and then performing heat treatment to precipitate a soft magnetic phase and a hard magnetic phase.

The glassy alloy composition preferably has the composition represented by the following formula (1):

$$Fe_{100-x-y-z-w}R_xM_yT_zB_w \quad \text{Formula (1)}$$

wherein R is the rare earth element, M is the metal, T is at least one element selected from Co and Ni, and the composition ratios x, Y, Z and w by atomic % satisfy 2 atomic %≦x≦15 atomic %, 2 atomic %≦y≦20 atomic %, 0≦z≦20 atomic %, and 10 atomic %≦w≦30 atomic %, respectively. Also element L (at least one element selected from Ru, Rh, Pd, Os, Ir, Pt, Al, Si, Ge, Ga, Sn, C and P) may be added up to an upper limit of 5 atomic %.

The present invention also provides a method of producing the cast magnet comprising melting the glassy alloy composition, casting the resultant melt to form a solidified product of the glassy alloy, and then performing heat treatment to precipitate a soft magnetic phase and a hard magnetic phase. The heat treatment of the glassy alloy solidified product obtained by casting is preferably carried out at a temperature in the range of 500 to 850° C.

In order to achieve the objects, the present invention further employs the following construction.

A stepping motor of the present invention comprises a stator comprising an electromagnet, and a rotor comprising a hard magnetic alloy having a supercooled liquid region, wherein the hard magnetic alloy comprises Fe as a main component, at least one element R selected from the rare earth elements, at least one element M selected from Ti, Zr, Hf, V, Nb, Ta, Cr, Mo, W and Cu, and B, and has a supercooled liquid region having a temperature width ΔTx of 20 K or more represented by the equation ΔTx=Tx−Tg (wherein Tx is the crystallization temperature, and Tg is the glass transition temperature).

In the above-mentioned stepping motor of the present invention, the hard magnetic alloy having a supercooled liquid region may have the composition represented by the following formula:

$$Fe_{100-x-y-z-w}R_xM_yT_zB_w$$

wherein T is at least one element selected from Co and Ni, and the composition ratios x, Y, Z and w by atomic % satisfy 2≦x≦15, 2≦y≦20, 0≦z≦20, and 10≦w≦30, respectively.

In the above-mentioned stepping motor of the present invention, the hard magnetic alloy having a supercooled liquid region may have the composition represented by the following formula:

$$Fe_{100-x-y-z-w-t}R_xM_yT_zB_wL_t$$

wherein T is at least one element selected from Co and Ni, L is at least one element selected from Ru, Rh, Pd, Os, Ir, Pt, Al, Si, Ge, Ga, Sn, C and P, and the composition ratios x, Y, Z, w and t by atomic % satisfy 2≦x≦15, 2≦y≦20, 0≦z≦20, 10≦w≦30, and 0≦t≦5, respectively.

In the above-described stepping motor of the present invention, the hard magnetic alloy is obtained by heat treatment and comprises the precipitated crystalline phase composed of at least one of a α-Fe phase and Fe₃B phase, and the precipitated crystalline phase composed of a Nd₂Fe₁₄B phase.

A speaker of the present invention comprises a speaker magnet comprising a hard magnetic alloy containing Fe as a main component, at least one element R selected from the rare earth elements, at least one element M selected from Ti, Zr, Hf, V, Nb, Ta, Cr, Mo, W and Cu, and B, and having a supercooled liquid region having a temperature width ΔTx of 20° C. or more represented by the equation ΔTx=Tx−Tg (wherein Tx is the crystallization temperature, and Tg is the glass transition temperature).

The hard magnetic alloy having a supercooled liquid region may be represented by the following composition formula:

$$Fe_{100-x-y-z-w}R_xM_yT_zB_w$$

wherein T is at least one element selected from Co and Ni, and the composition ratios x, Y, Z and w by atomic % satisfy 2≦x≦15, 2≦y≦20, 0≦z≦20, and 10≦w≦30, respectively.

The hard magnetic alloy having a supercooled liquid region may be represented by the following composition formula:

$$Fe_{100-x-y-z-w-t}R_xM_yT_zB_wL_t$$

wherein T is at least one element selected from Co and Ni, L is at least one element selected from Ru, Rh, Pd, Os, Ir, Pt, Al, Si, Ge, Ga, Sn, C and P, and the composition ratios x, Y, Z, w and t by atomic % satisfy 2≦x≦15, 2≦y≦20, 0≦z≦20, 10≦w≦30, and 0≦t≦5, respectively.

The hard magnetic alloy having a supercooled liquid region may be subjected to heat treatment and comprise the precipitated crystalline phase composed of at least one of a α-Fe phase and Fe$_3$B phase, and the precipitated crystalline phase composed of a Nd$_2$Fe$_{14}$B phase.

In the present invention, even if the hard magnetic alloy contains small amounts of impurities inevitable in the production process, for example, rare earth oxides, and the like, it can be considered as lying within the scope of the technical idea of the hard magnetic alloy having a supercooled liquid region of the present invention.

BRIEF DESCRIPTION OF THE DRAWINGS

FIGS. 8A and 8B are drawings showing a rotor of a hybrid stepping motor, in which FIG. 8A is a sectional plan view of the rotor, and FIG. 8B is a schematic drawing showing the positional relation of the two rotor tooth poles of the rotor;

FIGS. 9A and 9B are drawings illustrating the operation of a hybrid stepping motor, in which FIG. 9A is an enlarged schematic drawing of a rotor and a stator, and FIG. 9B is an enlarged schematic drawing of another rotor and stator;

FIG. 10A and 10B are drawings illustrating the operation of a hybrid stepping motor, in which FIG. 10A is an enlarged schematic drawing of a rotor and a stator, and FIG. 10B is an enlarged schematic drawing of another rotor and stator;

DESCRIPTION OF THE PREFERRED EMBODIMENT

Figure 1:
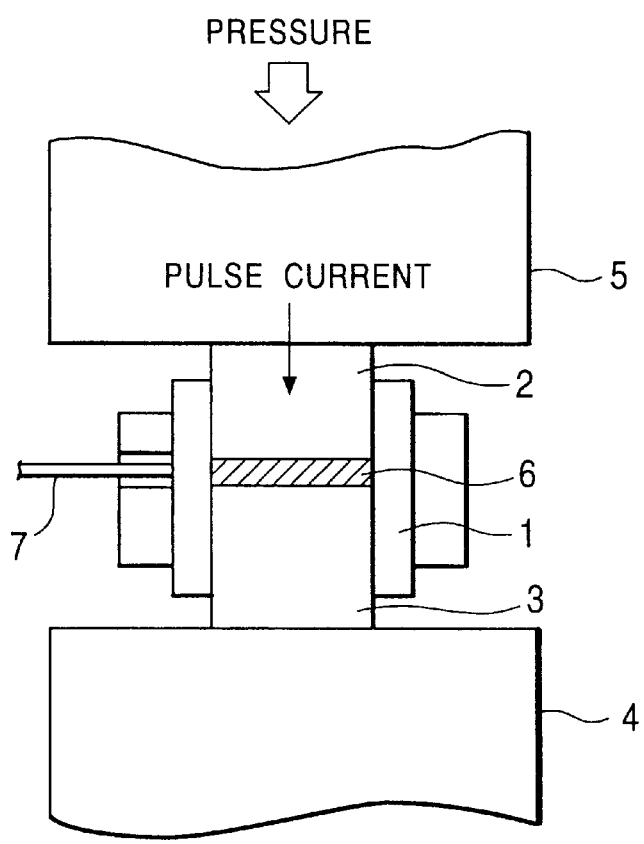
FIG. 1 is a sectional view showing the structure of a principal portion of an example of spark plasma sintering apparatus used for carrying out a method of producing a hard magnetic alloy sintered compact of the present invention.

Embodiments of the present invention will be described with reference to the drawings.

A hard magnetic alloy having a supercooled liquid region of the present invention is obtained by heat treatment of a glassy alloy at a rate of temperature rise of 20° C./min or more, wherein the glassy alloy comprises Fe as a main component, at least one element R selected from the rare earth elements, at least one element M selected from Ti, Zr, Hf, V, Nb, Ta, Cr, Mo, W and Cu, and B, has a supercooled liquid region having a temperature width ΔTx of 20° C. or more represented by the equation ΔTx=Tx−Tg (wherein Tx is the crystallization temperature, and Tg is the glass transition temperature).

The above composition system preferably necessarily contains Cr because ΔTx is 40° C. or more.

An example of the hard magnetic alloy having a supercooled liquid region according to the present invention may be represented by the following formula:

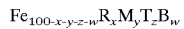

wherein T is at least one element selected from Co and Ni, and the composition ratios x, Y, Z and w by atomic % preferably satisfy 2 atomic %≦x≦15 atomic %, 2 atomic %≦y≦20 atomic %, 0≦z≦20 atomic %, and 10 atomic %≦w≦30 atomic %, respectively.

Another example of the hard magnetic alloy having a supercooled liquid region according to the present invention is represented by the following formula:

wherein T is at least one element selected from Co and Ni, the composition ratios x, Y, Z, w and t by atomic % satisfy 2 atomic %≦x≦15 atomic %, 2 atomic %≦y≦20 atomic %, 0≦z≦20 atomic %, 10 atomic %≦w≦30 atomic %, and 0≦t≦5 atomic %, respectively, and L is at least one element selected from Ru, Rh, Pd, Os, Ir, Pt, Al, Si, Ge, Ga, Sn, C and P.

In the present invention, in the composition formula $Fe_{100-x-y-z-w}R_xM_yT_zB_w$ or $Fe_{100-x-y-z-w-t}R_xM_yT_zB_wL_t$, the composition ratio x is preferably in the range of 2 atomic % ≦ x ≦ 12 atomic %, and more preferably in the range of 2 atomic % ≦ x ≦ 8 atomic %.

In the present invention, in the composition formula $Fe_{100-x-y-z-w}R_xM_yT_zB_w$ or $Fe_{100-x-y-z-w-t}R_xM_yT_zB_wL_t$, the composition ratio y is preferably in the range of 2 atomic % ≦ y ≦ 15 atomic %, and more preferably in the range of 2 atomic % ≦ y ≦ 6 atomic %.

In the present invention, in the composition formula $Fe_{100-x-y-z-w}R_xM_yT_zB_w$ or $Fe_{100-x-y-z-w-t}R_xM_yT_zB_wL_t$, the composition ratio z is preferably in the range of 0.1 atomic % ≦ z ≦ 20 atomic %, and more preferably in the range of 2 atomic t ≦ z ≦ 10 atomic %.

In the present invention, in the composition formula $Fe_{100-x-y-z-w}R_xM_yT_zB_w$ or $Fe_{100-x-y-z-w-t}R_xM_yT_zB_wL_t$, element M may be represented by $(Cr_{1-a}M'_a)$ wherein M' is at least one element selected from Ti, Zr, Hf, V, Nb, Ta, Mo, W and Cu, and 0 ≦ a ≦ 1. Furthermore, in the hard magnetic alloy represented by the above formula, the composition ratio a is preferably in the range of 0 ≦ a ≦ 0.5.

In heat treatment in the present invention, heating is preferably performed at a holding temperature of 500 to 850° C., more preferably 550 to 750° C., because the hard magnetic alloy having improved coercive force and maximum energy product can be obtained. After heat treatment (heating), the hard magnetic alloy is cooled by means such as water quenching or the like.

From the viewpoint of improvements in the coercive force and maximum energy product of the hard magnetic alloy, in the heat treatment, the rate of the temperature rise to the holding temperature is 20° C./min or more, preferably 20 to 80° C./min, and more preferably 40 to 80° C./min.

In the present invention, the above heat treatment of the glassy alloy in the above composition system can cause precipitation of a crystalline phase composed of at least one of an α-Fe phase and a $Fe_3B$ phase, and a crystalline phase composed of a $Nd_2Fe_{14}B$ phase. Since the hard magnetic alloy obtained by the heat treatment has a mixed phase state comprising a soft magnetic phase composed of the precipitated α-Fe phase and a hard magnetic phase composed of the precipitated $Nd_2Fe_{14}B$ phase, and thus exhibits the properties of an exchange spring magnet in which the soft magnetic phase and hard magnetic phase are magnetically coupled. In the present invention, the alloy having ΔTx before heat treatment is considered as a glassy alloy and differentiated from an amorphous alloy without ΔTx.

[Reason for Limiting the Composition]

In the composition system of the present invention, Fe as a main component and Co are elements which bear magnetism and are important for obtaining a high saturation magnetic flux density and excellent hard magnetic properties.

In a composition system containing a large amount of Fe, ΔTx tends to increase, and the value of ΔTx can be increased by appropriately setting the Co content. The addition of combination with another element permits an increase in the value of ΔTx without deterioration in magnetic properties, and has the effect of increasing the Curie temperature and decreasing the temperature coefficient.

Specifically, in order to securely obtain ΔTx, the composition ratio z of element T is preferably in the range of 0 ≦ z ≦ 20 atomic %, and in order to securely obtain a ΔTx of 20° C. or more, the composition ratio z of element T is preferably in the range of 2 atomic % ≦ z ≦ 10 atomic %.

Co may be partially or entirely replaced by Ni according to demand.

R is at least one element selected from the rare earth elements (Y, La, Ce, Pr, Nd, Gd, Tb, Dy, Ho and Er). Since a $R_2Fe_{14}B$ phase composed of a compound of a rare earth element produces monoaxial magnetic anisotropy, R is an element effective in increasing coercive force (iHc), and the R content is preferably in the range of 2 atomic % to 15 atomic %. In order to maintain high magnetization without decreasing the Fe content, and maintain a magnetic balance with coercive force (iHc), the R content. is preferably in the range of 2 atomic % to 12 atomic %, more preferably in the range of 2 atomic % to 8 atomic %.

M is at least one element selected from Ti, Zr, Hf, V, Nb, Ta, Cr, Mo, W and Cu, which are elements effective in producing an amorphous phase, and the M content is preferably in the range of 2 atomic % to 20 atomic %. In order to obtain higher magnetic properties, the M content is preferably 2 atomic % to 15 atomic %, more preferably 2 atomic % to 6 atomic %. Of these elements M, Cr is particularly effective. Cr may be partially replaced by at least one element selected from Ti, Zr, Hf, V, Nb, Ta, Mo, W and Cu. In replacement, with a composition ratio a in the range of 0 ≦ a ≦ 1, high ΔTx can be obtained. However, in order to securely obtain particularly high ΔTx, the composition ratio a is preferably in the range of 0 ≦ a ≦ 0.5. Of the elements M, Cu has the effect of preventing the crystals from being coarsened in crystallization for providing hard magnetism, and the function to improve hard magnetic properties.

B has the high ability to form an amorphous phase, and the amount of B added is 10 atomic % to 30 atomic %. With an amount of B added of less than 10 atomic %, ΔTx undesirably disappears, and with an amount of over 30 atomic %, the magnetic properties undesirably deteriorate. In order to obtain the higher amorphous forming ability and good magnetic properties, the amount of B added is preferably 14 atomic % to 20 atomic %.

Furthermore, at least one element L selected from Ru, Rh, Pd, Os, Ir, Pt, Al, Si, Ge, Ga, Sn, C and P may be added to the composition system.

In the present invention, at least one of these elements can be added in the range of 0 to 5 atomic %. At least one of these elements is added for mainly improving corrosion resistance. Out of the range, hard magnetic properties deteriorate, and the glass forming ability undesirably deteriorates.

In order to produce the hard magnetic alloy having the above composition system, for example, single powders or single blocks (which may be previously partly alloyed) of the respective elements are prepared and then mixed so that the above composition ranges are obtained. Then the mixed powders are melted in a melting device such as a crucible in an atmosphere of inert gas such as Ar gas or the like to obtain an alloy melt having the predetermined composition.

Then, the alloy melt is cast into a casting mold and slowly cooled or quenched by a single roll method to obtain a glassy alloy. The thus-obtained glassy alloy is subjected to heat treatment to precipitate the predetermined crystalline phases. As a result, a bulk-shaped permanent magnet molding thicker than a permanent magnet molding obtained from an amorphous thin ribbon obtained by a conventional liquid quenching method can easily be obtained without including rubber or a plastic. In this method, the rate of temperature rise in heat treatment is 20° C./min or more.

The single roll method is a method comprising quenching a melt by spraying onto a rotating metallic roll to obtain a thin ribbon of an amorphous alloy.

In the thus-obtained bulk-shaped glassy alloy, heat treatment of a glassy alloy having the above composition at a rate of temperature rise of 20C/min or more forms a mixed phase state comprising the soft magnetic phase composed of the precipitated α-Fe phase and the hard magnetic phase composed of the precipitated $Nd_2Fe_{14}B$ phase. Also the property of exchange coupling of the soft magnetic phase and the hard magnetic phase can be improved to increase coercive force and maximum magnetic energy product, thereby obtaining excellent hard magnetic properties.

The bulk-shaped hard magnetic alloy contains no binder such as rubber, plastic or the like, and thus has good magnetic properties and the advantage of high material strength. The bulk-shaped hard magnetic alloy also has excellent corrosion resistance and good rust resistance.

A sintered compact of the hard magnetic alloy in accordance with an embodiment of the present invention is described with reference to the drawings.

FIG. 1 shows a principal portion of a spark plasma sintering apparatus suitable for producing a hard magnetic alloy sintered compact (referred to as "the sintered compact of the present invention" hereinafter) of the present invention. The spark plasma sintering apparatus comprises a cylindrical die 1, an upper punch 2 and a lower punch 3 both of which are inserted into the die 1, a punch electrode 4 which supports the lower punch 3 and functions as one of electrodes for passing a pulse current which will be described below, a punch electrode 5 which presses the upper punch downward and functions as the other of the electrodes for passing the pulse current, and a thermocouple 7 for measuring the temperature of a raw powder 6 held between the upper and lower punches 2 and 3.

Figure 3:
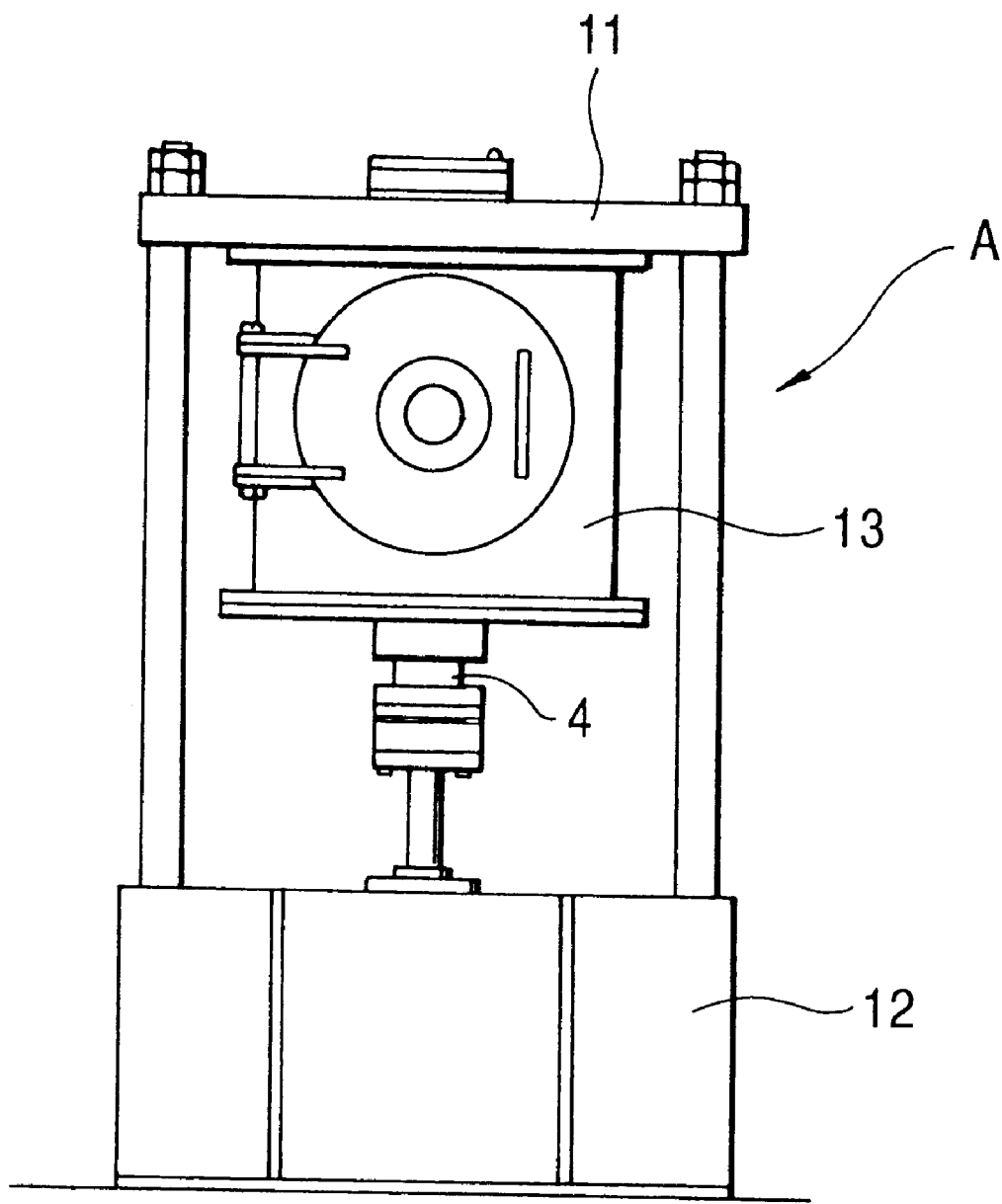
FIG. 3 is a front view showing the entire construction of an example of spark plasma sintering apparatus used for carrying out a method of producing a hard magnetic alloy sintered compact of the present invention.

FIG. 3 shows the entire structure of the spark plasma sintering apparatus. The spark plasma sintering apparatus A shown in FIG. 3 is a spark plasma sintering machine, Model SPS-2050 made of Sumitomo Coal Mining Co., Ltd., and has a principal portion having the structure shown in FIG. 1.

The apparatus shown in FIG. 3 comprises an upper base 11 and a lower base 12, a chamber 13 in contact with the upper base 11, and the structure shown in FIG. 1 most of which is contained in the chamber 13. The chamber 13 is connected to an evacuation device and an atmospheric gas supply device, which are not shown in the drawing, so that the raw powder 6 held between the upper and lower punches 2 and 3 can be maintained in a desired atmosphere such as an inert gas atmosphere or the like. Although a current carrying device is not shown in FIGS. 1 and 3, a current carrying device is separately provided to be connected to the upper and lower punches 2 and 3 and the punch electrodes 4 and 5 so that the pulse current shown in FIG. 2 can be supplied from the current carrying device through the punches 2 and 3 and the punch electrodes 4 and 5.

In production of the sintered compact of the present invention by using the spark plasma sintering apparatus having the above construction, the raw powder for molding is first prepared. The raw powder is obtained by melting a glassy alloy composition having the above predetermined composition, forming a glassy alloy material having one of various shapes such as bulk, ribbon, linear and powder shapes, and the like by a casting method, a single roll or double roll quenching method, a liquid spinning method, a solution extraction method, a high-pressure gas spraying method or the like, and then powdering the glassy alloy material having a shape other than a powder shape. The space between the upper and lower punches 2 and 3 of the die 1 is filled with the thus-obtained powder, for example, the raw powder 6 shown in FIG. 1, and a pulse current is preferably applied under pressure in the range of 200 to 1500 MPa to preferably sinter the powder by heating to a temperature in the range of $Tx-250 \leq Ts \leq Tx+250$ at a rate of temperature rise of 40° C./min or more, to produce the sintered compact of the present invention.

The glassy alloy used in the present invention has a temperature width $\Delta Tx$ between the glass transition temperature Tg and the crystallization temperature Tx. $\Delta Tx$ is 20° C. or more, and some compositions has $\Delta Tx$ of as large as 40° C. or more or 60° C. or more. Therefore, an amorphous material is basically formed by solidification in the temperature range of $\Delta Tx$. By applying appropriate heat and pressure to the amorphous powder by, for example, a spark plasma sintering method, fine particles of the amorphous powder are softened, with the surfaces fused with each other to obtain the sintered compact. On the other hand, in heating and subsequent cooling, for example, when the rare earth element R is Nd, a hard magnetic crystalline phase such as the $Nd_2Fe_{14}B$ phase is precipitated in the amorphous powder fine particles, and magnetic anisotropy is imparted to the softened amorphous matrix, followed by solidification to form a hard magnetic sintered compact. Depending upon the sintering temperature, a sintered compact is formed in an amorphous state, followed by heat treatment at a temperature higher than the crystallization temperature Tx to precipitate fine crystalline phases, for example, the $Nd_2Fe_{14}B$ phase, Fe phase and $Fe_3B$ phase when the rare earth element is Nd. The crystalline phases are made nanocomposite to form a hard magnetic sintered compact.

Description will now be made of the method of sintering the thus-obtained glassy alloy.

Figure 2:
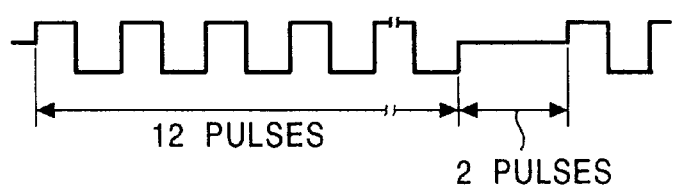
FIG. 2 is a drawing showing an example of the waveforms of pulse currents applied to an alloy powder in the spark plasma sintering apparatus shown in FIG. 1.

The glassy alloy obtained in any one of the above methods is ground, and sufficiently mixed to obtain a uniform composition, to produce a raw powder for sintering. The raw powder preferably has a particle diameter of 50 to 150 µm. Then the space between the upper and lower punches 2 and 3 of the spark plasma sintering apparatus shown in FIG. 1 or 3 is filled with the raw powder, and the inside of the chamber 13 is evacuated or replaced with an inert gas. A pulse current, for example, as shown in FIG. 2, is applied to the raw powder under pressure applied from the upper and lower punches 2 and 3, to mold the raw powder under heating.

The applied pressure is preferably in the range of 200 to 1500 MPa, more preferably in the range of 500 to 1000 MPa. The thus-obtained hard magnetic alloy sintered compact is a strong sintered compact having a fine texture structure and used as a small strong permanent magnet having rigidity as a physical property. The sintered compact preferably has a relative density of 90% or more. Under the applied pressure of less than 200 MPa, it is difficult to impart anisotropy to the hard magnetic phase, and the percentage of void of the obtained sintered compact is undesirably increased to decrease the molding density. Under the applied pressure of over 1500 MPa, the strength of the WC (tungsten carbide) die is undesirably insufficient at high temperature.

In heating, the rate of temperature rise is 10° C./min or more, preferably 20° C./min or more, more preferably 40° C./min or more. At a rate of temperature rise of less than 10° C./min, crystal grains are coarsened to deteriorate the hard magnetic properties.

In the spark plasma sintering method, if the crystallization temperature of the amorphous glassy alloy is Tx, the sintering temperature Ts (° C.) is preferably in the range of $Tx-250 \leq Ts \leq Tx+250$. At a sintering temperature Ts of lower than Tx−250, it is difficult to form a high-density sintered compact because the temperature is too low. At a sintering temperature Ts of over Tx+250, the hard magnetic properties undesirably deteriorate due to grain growth of the fine crystalline phase.

At a sintering temperature Ts in the above range, the system is softened, and powder particles are densely compressed and fused with each other under pressure to form a high-density bulk body according to the shape of the mold used. At the same time, structural short-range ordering occurs in the texture to produce and grow crystal nuclei having hard magnetism, such as the $Nd_2Fe_{14}B$ phase, and the produced hard magnetic fine crystals form an exchange spring magnet with the soft magnetic crystalline phase produced at the same time to cause magnetic anisotropy in the bulk body. By imparting magnetic anisotropy to the crystal axis of the hard magnetic phase, high remanent magnetization (Ir) is obtained, as compared with the case of magnetic isotropy. Therefore, the sintered compact of the present invention obtained after cooling comprises a strong bulk body having a high density according to the shape of any desired mold, and serves as a permanent magnet having improved coercive force and maximum energy product.

In the above-mentioned spark plasma sintering, the temperature of the entire raw powder can be uniformly increased at the predetermined rate, and the temperature of the raw powder can be strictly controlled according to the value of the current conducted. Therefore, the temperature can be more precisely controlled than heating by a heater, and a high-density sintered compact without a difference in the degree of sintering between the outside and the inside can be obtained.

If required, the sintered compact obtained may be again subjected to heat treatment in the range of 400 to 1000° C. In some cases, this causes precipitation of the hard magnetic fine crystalline phase having an average crystal grain diameter of 100 nm or less at a higher density in the sintered compact, thereby improving the hard magnetic properties.

Description will now be made of a cast magnet in accordance with an embodiment of the present invention with reference to the drawings.

Figure 4:
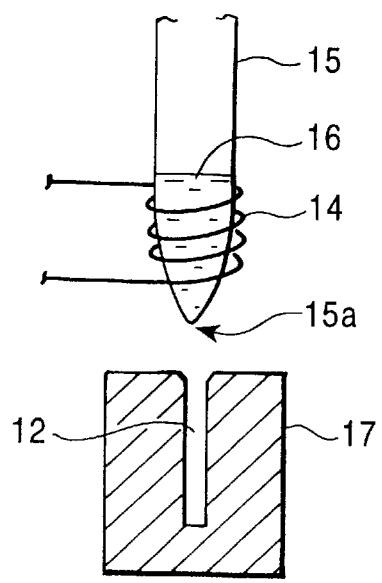
FIG. 4 is a schematic drawing showing an example of casting apparatus used for producing a cast magnet of the present invention.

FIG. 4 shows an example of the casting apparatus used for producing a cast magnet of the present invention. In FIG. 4, the casting apparatus comprises a crucible 15 and a mold 17. The crucible 15 comprises a heating high-frequency coil 14 provided on the periphery thereof so that a current is passed through the high-frequency coil 14 to melt an alloy composition 16 of the present invention contained in the crucible 15 by heating. At the lower end of the crucible 15 is formed a nozzle 15a, and the mold 17 made of copper or the like is arranged below the nozzle 15a. The mold 17 comprises a cylindrical casting cavity 18 formed therein.

Although not shown in the drawing, an inert gas supply device is connected to the upper portion of the crucible 15 so that the inside of the crucible 15 can be maintained in an inert gas atmosphere, and if required, the pressure in the crucible 15 can be increased to inject the melt of the composition 16 into the casting cavity 18 of the mold 17 through the nozzle 15a of the crucible 15.

Figure 5:
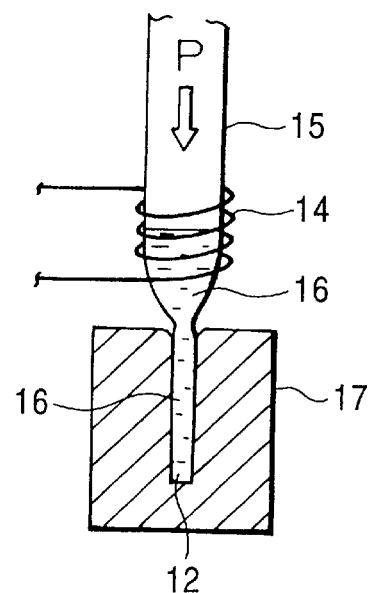
FIG. 5 is a schematic drawing showing the state wherein the casting apparatus shown in FIG. 4 is used.

In order to obtain a solidified product of the glassy alloy by using the apparatus shown in FIG. 4, as shown in FIG. 5, predetermined pressure P is applied to the inside of the crucible 15 to inject the melt into the casting cavity 18 of the mold 17 through the nozzle 15a of the crucible 15, followed by casting and then cooling of the cast melt. As a result, a solidified product of the glassy alloy can be obtained.

The thus-obtained solidified product is removed from the mold, subjected to heat treatment at a temperature in the range of 500 to 850° C., and then cooled to precipitate the soft magnetic phase and the hard magnetic phase, thereby obtaining a cast magnet exhibiting exchange spring magnet properties and having high Ir and iHc.

The glassy alloy composition used in the present invention has a temperature width $\Delta Tx$ between the crystallization temperature Tx and the glass transition temperature Tg. Since $\Delta Tx$ is 20° C. or more, and some compositions have $\Delta Tx$ of as large as 40° C. or more or 60° C. or more, the glassy alloy has the high ability to form an amorphous phase, and a larger solidified product of the glassy alloy can be formed. This molding is amorphous in the cast state, and thus requires heat treatment accompanied with crystallization for providing hard magnetism. The heat treatment is preferably carried out at a temperature in the range of 500° C. (773 K) to 850° C. (923 K), and the heat treatment of the composition in this temperature range causes precipitation of the soft magnetic phase composed of α-Fe and $Fe_3B$ and the hard magnetic phase composed of $Nd_2Fe_{14}B$ to exhibit exchange spring magnet properties and obtain high remanent magnetization (Ir) and coercive force (iHc).

In heating for hat treatment, the rate of temperature rise is preferably 10° C./min or more, more preferably 20° C./min or more. At a rate of temperature rise of less than 10° C./min, crystal grains are coarsened to decrease the exchange coupling force, thereby causing the tendency that the hard magnetic properties deteriorate.

Figure 6:
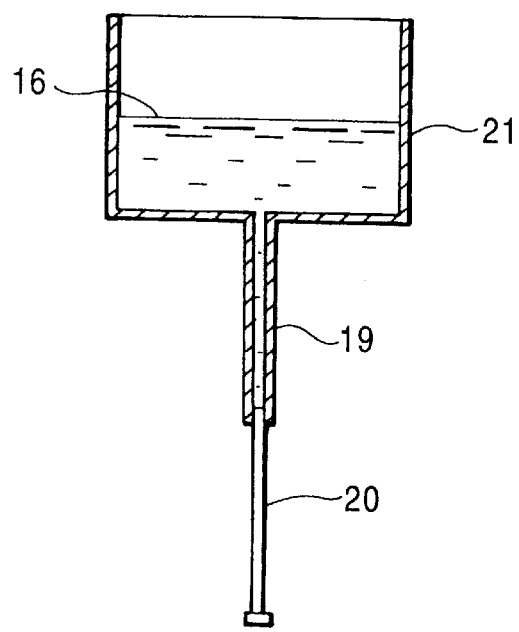
FIG. 6 is a schematic drawing showing another example of casting apparatus.

Although this embodiment relates to the casting apparatus comprising the crucible 15 and the mold 17, the shapes of the crucible and the mold are not limited to those described above. For example, such a casting apparatus as shown in FIG. 6 may be used, in which a crucible-like melting tank 21 comprises a cylinder 19 and a piston 20 provided as a crucible and a mold at the bottom thereof so that the melt 16 is drawn into the cylinder 19 and cooled by pulling down the piston 20. Of course, generally used various casting apparatus can be used.

Description will now be made of a stepping motor comprising the hard magnetic alloy in accordance with an embodiment of the present invention.

In order to produce a permanent magnet provided in the rotor of a stepping motor by using the hard magnet alloy having the above composition system, for example, single powders or single blocks (which may be previously partially alloyed) of the respective elements are prepared, and then mixed so that the above composition falls in the above ranges, and the mixed powders are melted in a melting device such as a crucible or the like in an inert gas atmosphere such as an Ar gas or the like to obtain an alloy melt having the predetermined composition.

Next, the alloy melt is flowed into the casting mold to form a cast product by the above casting method. After slow cooling, the product is subjected to heat treatment to obtain a bulk plate of the hard magnetic glassy alloy. Many bulk plates are laminated to obtain the permanent magnet used for the rotor.

Alternatively, the melt is quenched by spraying it on a rotating roll, followed by heat treatment to obtain a thin ribbon of the hard magnetic glassy alloy having a thickness of 50 μm or more. Many thin ribbons are laminated to obtain the permanent magnet for the rotor.

The hard magnetic glassy alloy of the present invention has a supercooled liquid region having a wide temperature width, and thus a thin ribbon (plate material) having a thickness of 50 μm or more can be obtained, thereby decreasing the number of the thin ribbons (plate materials) laminated.

The permanent magnet comprising the thus-obtained hard magnetic glassy alloy exhibits good magnetic properties and high material strength because no binder such as rubber, plastic or the like is included. Also the permanent magnet has excellent corrosion resistance and good rust resistance.

Furthermore, the permanent magnet of the rotor of the stepping motor can be formed by grinding a bulk plate material of the hard magnetic glassy alloy and then filling an appropriate mold with the powder obtained, followed by sintering by the spark plasma sintering method.

Although the above sintered compact is formed by the spark plasma sintering method, the forming method is not limited to this, and the permanent magnet of the rotor can also be obtained by an extrusion molding method or the like.

The rotor of the stepping motor comprises the hard magnetic alloy having a supercooled liquid region having a temperature width ΔTx of 20° C. or more, which is represented by the equation ΔTx=Tx−Tg (wherein Tx is the crystallization temperature, and Tg is the glass transition temperature), and thus a bulk shape can be obtained. Therefore, the rotor can easily be formed in the predetermined shape, thereby decreasing the production cost of the stepping motor.

Furthermore, there is no need for molding the material powder by sintering at high temperature, thereby decreasing the production cost of the stepping motor.

The hard magnetic glassy alloy can be molded to a predetermined shape by flowing an alloy melt in a casing mold or the like, or sintering a raw powder by a plasma. There is thus no need for using a binder such as rubber, plastic or the like, thereby causing no deterioration in magnetic properties and material strength. Therefore, even when the hard magnetic glassy alloy of the present invention is used as a component material for a driving unit such as the rotor of the stepping motor, there is no problem of mechanical strength.

Also, even when ribbons of the hard magnetic alloy obtained by the single roll method are laminated to form the permanent magnet, part of the hard magnetic alloy is amorphous and has high hardness. Therefore, even when the hard magnetic glassy alloy of the present invention is used as a component material for a driving unit such as the rotor of the stepping motor, there is no problem of mechanical strength.

In the hard magnetic alloy, a mixed phase state is formed by heat treatment in which the soft magnetic phase composed of the precipitated α-Fe phase, and the hard magnetic phase composed of the precipitated $Nd_2Fe_{14}B$ phase. Therefore, the hard magnetic alloy has the exchange spring magnet properties in which the soft magnetic phase and the hard magnetic phase are magnetically coupled, and thus the maximum magnetic energy product (($BH_{max}$)) can be increased, thereby increasing the rotational torque of the stepping motor.

Also the hard magnetic alloy exhibits high coercive force (iHc), and thus permits miniaturization of the stepping motor.

The construction of the stepping motor is described.

The stepping motor is a special motor in which the amount of rotation can be arbitrarily controlled by a pulse current. Therefore, the stepping motor requires no feedback control, is capable of positioning in an open loop, and can thus be used as a driving source in a positioning system in various fields. Particularly, since a hybrid stepping motor exhibits high rotational torque and is small and capable of performing precise positioning control, the stepping motor is used as a driving source of a driving mechanism in a copying machine, a computer, or the like.

The hybrid type stepping motor (referred to as "the HB type motor" hereinafter) is described with reference to the drawings.

Figure 7:
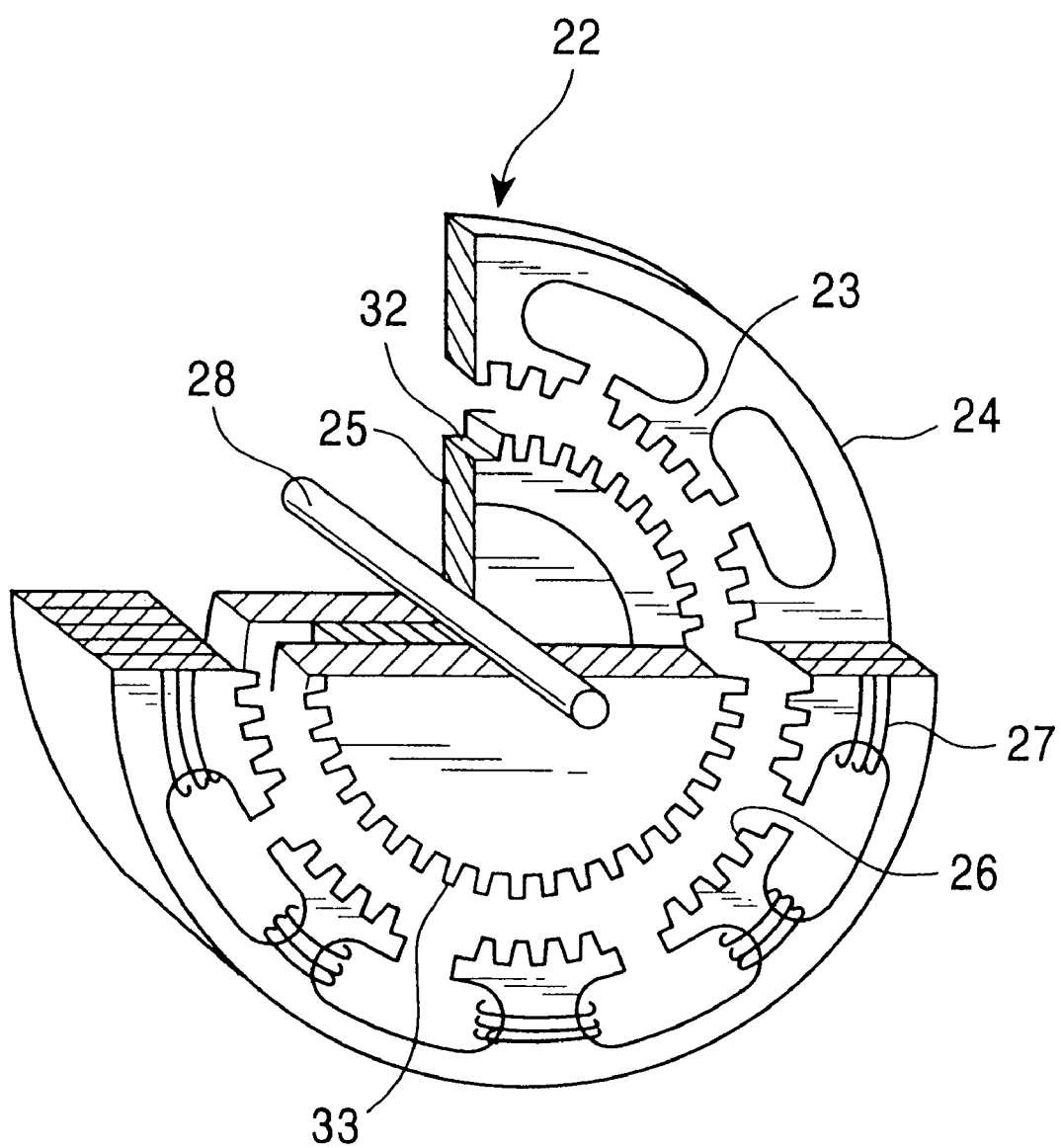
FIG. 7 is a perspective sectional view showing a hybrid stepping motor.

Referring FIG. 7, a HB type motor 22 comprises a stator 24 comprising a stator 23, and a rotor 25.

The stator 23 has a plurality of stator tooth poles 26 formed in the surface on the rotor side thereof. The stator 23 is made of a soft magnetic material having high magnetic permeability, and a lead wire 27 is wound on the stator 23. The stator 23 and the lead wire 27 constitute an electromagnet. The lead wire 27 is connected to a driving circuit not shown in the drawing.

By alternately passing currents having opposite polarities through the lead wire 27 from the driving circuit, the stator tooth poles 26 on the surface on the rotor side are alternately magnetized to the N and S poles.

Figure 8A:
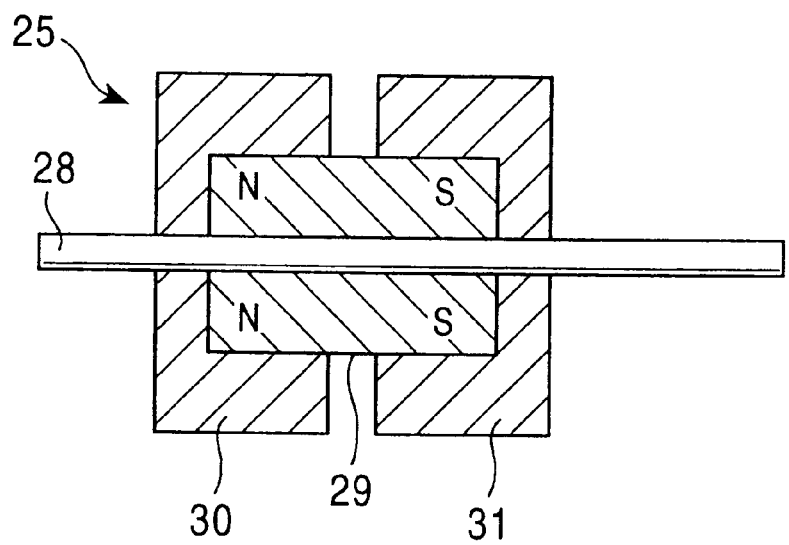

In FIGS. 7 and 8A, the rotor 25 comprises a shaft 28, a cylindrical hard magnetic alloy 29 into which the shaft 28 is inserted, and two pairs of cylindrical rotors 30 and 31 which are fit to both ends of the hard magnetic alloy 29.

The hard magnetic alloy 29 is arranged so that the direction of the magnetic flux is parallel to the length direction of the shaft 28. The rotors 30 and 31 are made of a soft magnetic material having high magnetic permeability, the rotor 30 being magnetized to the N pole, the other 31 being magnetized to the S pole.

The rotor 30 has a plurality of tooth poles 32 formed in the surface on the stator side thereof, and the rotor 31 has a plurality of tooth poles 33 formed in the surface on the stator side thereof.

Figure 8B:
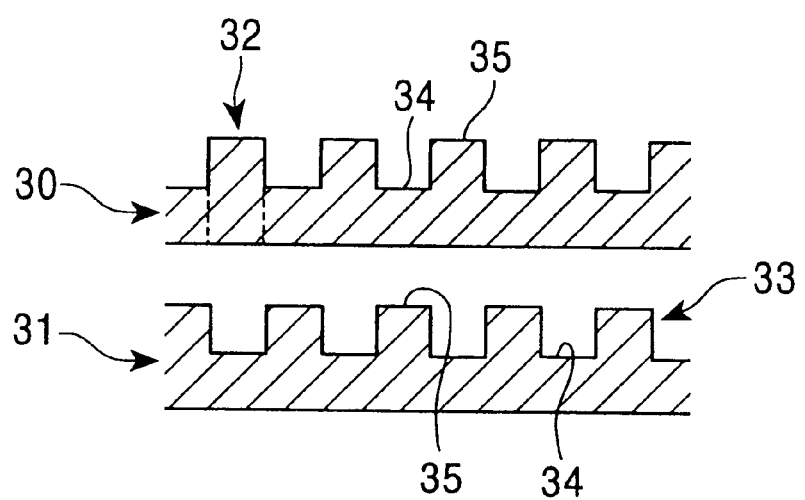

As shown in FIG. 8B, the rotor tooth poles 32 and the rotor tooth poles 33 are arranged at both ends of the hard magnetic alloy 29 so that the troughs 34 and the crests 35 of one of the rotors are shifted from the other rotor in the length direction of the shaft 28.

The operation of the HB type motor 22 is described.

Figure 9A:
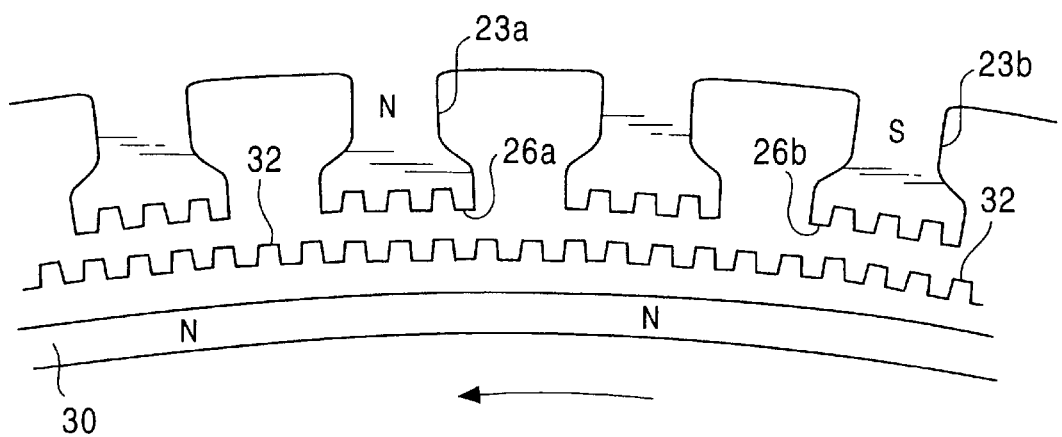
Figure 9B:
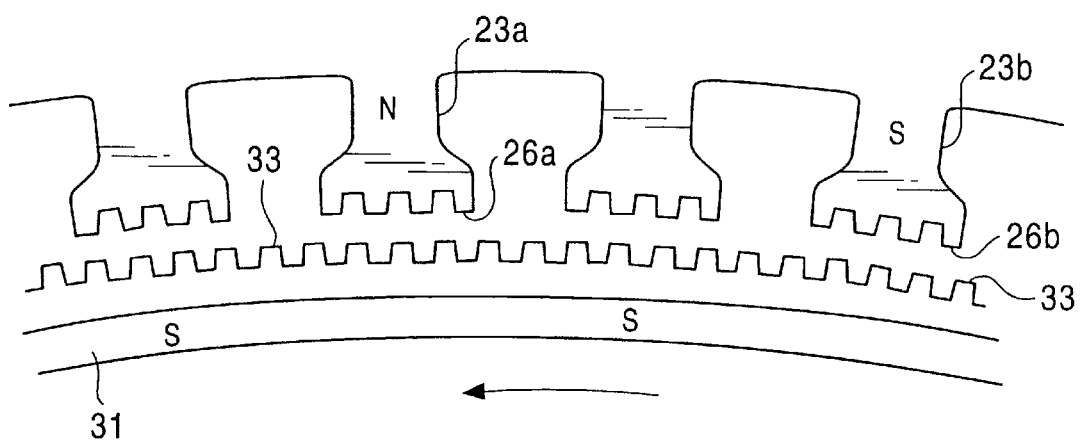

In FIGS. 9A and 9B, the stator tooth poles 26a of a stator 23a are magnetized to the N pole by the current passed through the lead 27 from the driving circuit, the stator tooth poles 26b of a stator 23b are magnetized to the S pole.

Since the rotor tooth poles 32 of the rotor 30 are magnetized to the N pole, magnetic fluxes between the rotor tooth poles 32 and the stator tooth poles 26a are cancelled, and magnetic fluxes between the rotor tooth poles 32 and the stator tooth poles 26b are intensified.

Also, since the rotor tooth poles 33 of the rotor 31 are magnetized to the S pole, magnetic fluxes between the rotor tooth poles 33 and the stator tooth poles 26a are intensified, and magnetic fluxes between the rotor tooth poles 33 and the stator tooth poles 26b are cancelled.

Since the rotor tooth poles 32 and the other rotor tooth poles 33 are arranged so that the troughs 34 and the crests 35 of one rotor are shifted from the other rotor, the rotor tooth poles 32 and the stator tooth poles 26b, and the rotor tooth poles 33 and the stator tooth poles 26a attract each other to rotate the rotors 30 and 31 by an amount corresponding to one crest 35 of the rotor tooth poles 32 and 33, respectively, in the direction shown by arrows in the drawing.

Figure 10A:
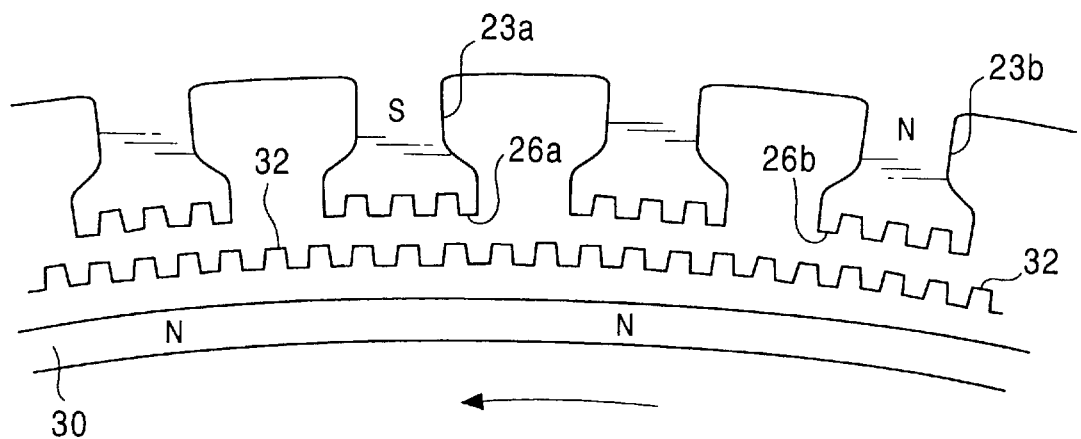
Figure 10B:
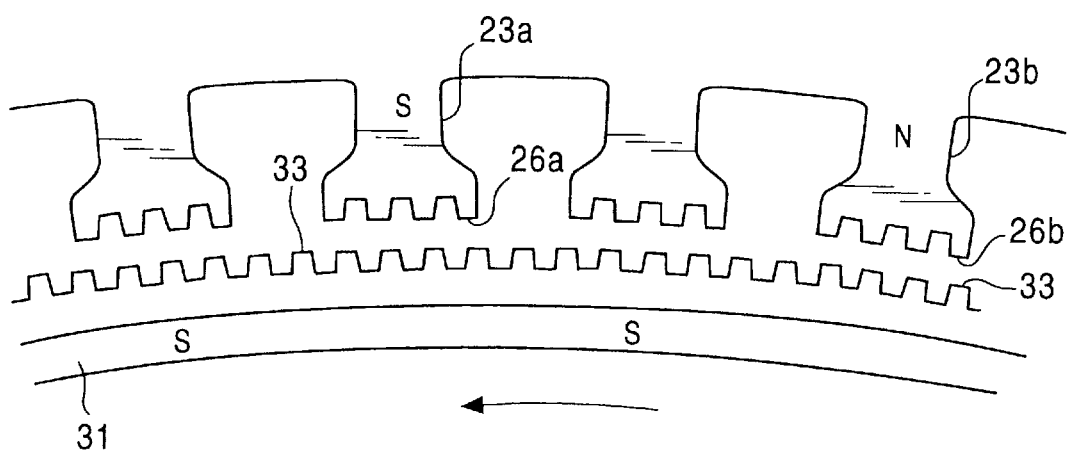

Next, in FIGS. 10A and 10B, by changing the polarity of the current from the control circuit, the stator tooth poles 26a are magnetized to the S pole, and the stator tooth poles 26b are magnetized to the N pole. In this case, magnetic fluxes are intensified between the rotor tooth poles 32 and the stator tooth poles 26a, and magnetic fluxes are cancelled between the rotor tooth poles 32 and the stator tooth poles 26b.

Also, magnetic fluxes are cancelled between the rotor tooth poles 33 and the stator tooth poles 26a, and magnetic fluxes are intensified between the rotor tooth poles 33 and the stator tooth poles 26b.

Therefore, the rotor tooth poles 32 and the stator tooth poles 26a, and the rotor tooth poles 33 and the stator tooth poles 26b attract each other to rotate the rotors 30 and 31 by an amount corresponding to one crest 35 of the rotor tooth poles 32 and 33, respectively, in the left-hand direction shown in the drawing.

In this way, by passing the current through the HB type motor 22 from the driving circuit, the rotor 25 can be driven for a predetermined rotation angle.

The properties of the hard magnetic alloy are represented by the second quadrants of hysteresis curves, i.e., demagnetization curves. After magnetization, the hard magnetic alloy is under the reverse magnetic field, i.e., the diamagnetic field, produced by its remanent magnetization, and thus the operating point (the magnetic flux density (B) and demagnetizing field (H) of a material) is represented by a point p on the demagnetization curve thereof. At this point, the product (BH) represents the maximum energy product $((BH)_{max})$.

In order to increase the rotational torque of the stepping motor, it is important to use the hard magnetic alloy having the high maximum energy product $((BH)_{max})$.

Since the rotational torque of the stepping motor is proportional to the product of the current passing through the stepping motor and the energy (U) of the magnetostatic field produced outside by a hard magnetic alloy, the rotational torque of the stepping motor is increased by increasing the maximum energy product $((BH)_{max}x)$.

In order to increase the maximum energy product $((BH)_{max})$ of a hard magnetic alloy, it is necessary to made the shape of a demagnetization curve angular to increase the area surrounded by the demagnetization curve, the magnetic field axis and the magnetization axis. Namely, it is necessary to increase the remanence ratio (Ir/Is) to increase remanent magnetization (Ir) and coercive force (iHc).

Description will now be made of a speaker in accordance with an embodiment of the present invention with reference to the drawings.

Figure 11:
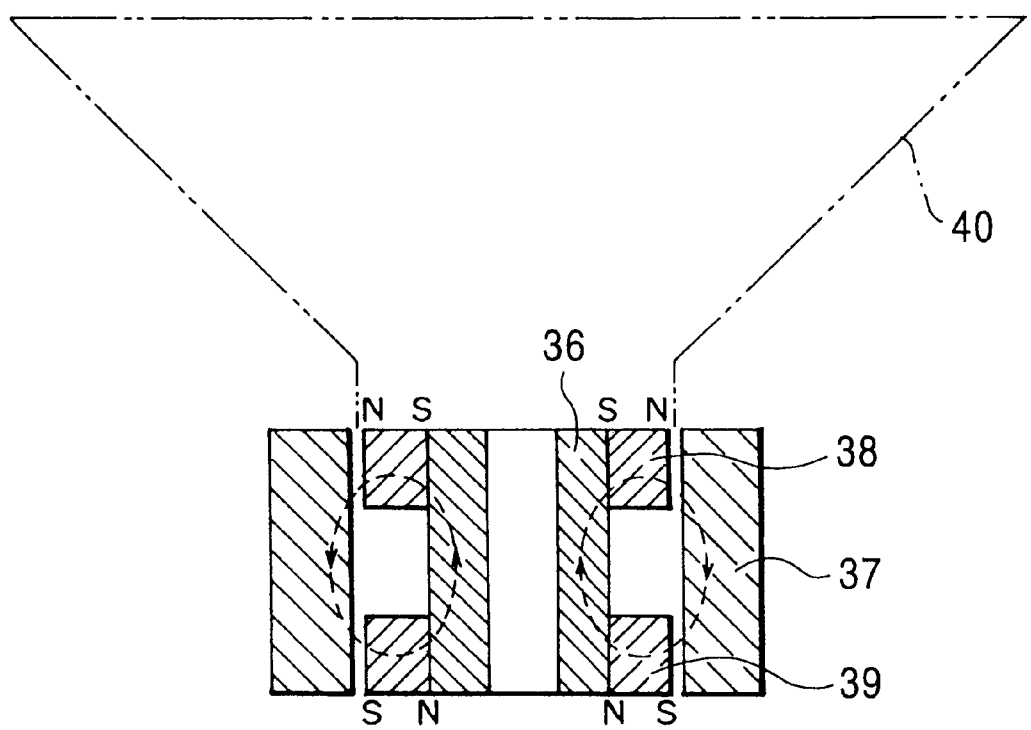
FIG. 11 is a sectional view showing a speaker in accordance with a first embodiment of the present invention.

FIG. 11 is a sectional view showing a speaker in accordance with a first embodiment of the present invention.

In FIG. 11, a speaker comprises a pole piece 36 made of iron, a cylindrical dust core (yoke) provided on the outside of the pole piece 36 with a space therebetween, and upper and lower speaker magnets 38 and 39 arranged in the space between the pole piece 36 and the yoke 37, and a conical diaphragm 40. The speaker magnets 38 and 39 are made of the hard magnetic alloy sintered compact or cast magnet of the present invention, and formed in a ring shape. Also, a voice coil (not shown in the drawing) is arranged in the magnetic gap formed by the speaker magnets 38 and 39, and is connected to the conical diaphragm 40. In the speaker constructed as described above, when a voice current flows through the voice coil from an amplifier, motion is accordingly caused to move the conical diaphragm 40 connected to the voice coil so that sounds can be emitted.

Figure 12:
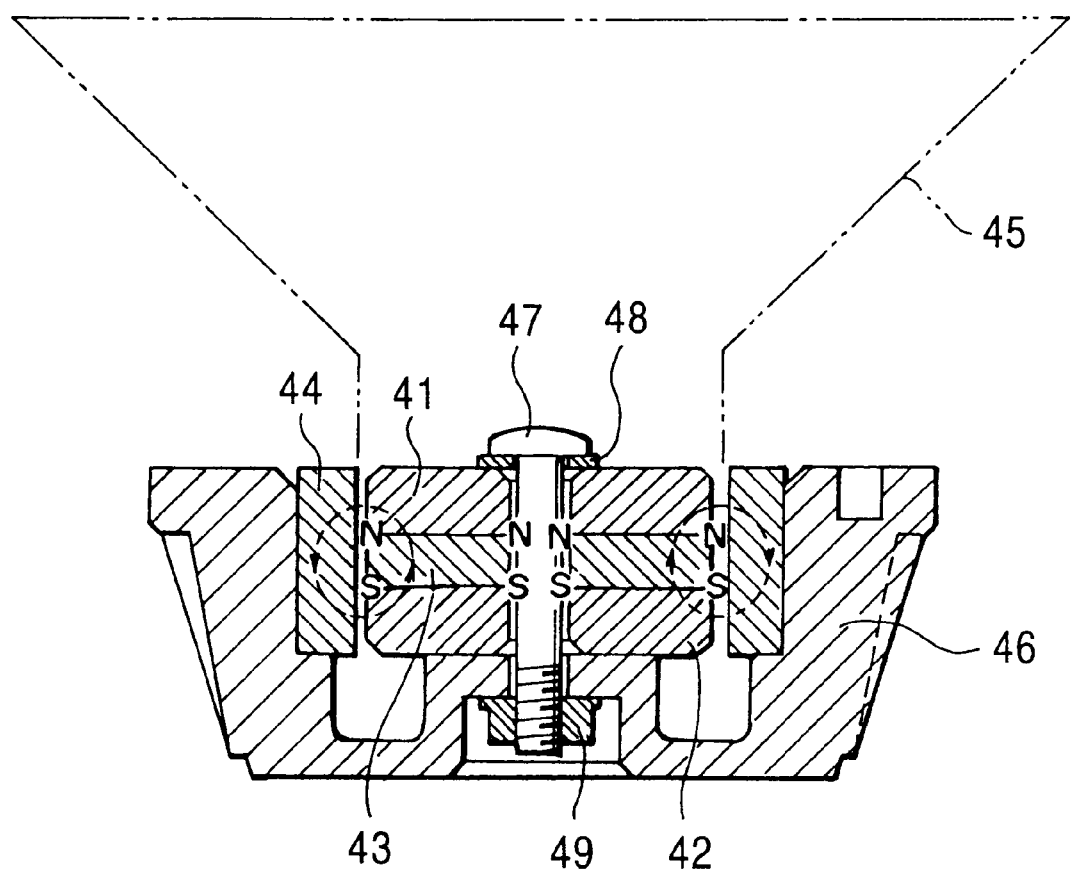
FIG. 12 is a sectional view showing a speaker in accordance with a second embodiment of the present invention.

FIG. 12 is a sectional view showing a speaker in accordance with a second embodiment of the present invention.

In FIG. 12, the speaker comprises a pair of upper and lower pole pieces 41 and 42 made of iron and arranged opposite to each other, a speaker magnet 43 disposed between the pole pieces 41 and 42, a cylindrical yoke 44 provided on the outside of the pole pieces 41 and 42 and the speaker magnet 43 with a space therebetween, a conical diaphragm 45, and a magnetic shielding cover 46. The speaker magnet 43 comprises the hard magnetic glassy alloy sintered compact, and is formed in a ring shape. The pole pieces 41 and 42, and the magnet 43 are mounted to the magnetic shielding cover 46 by means of a bolt 47, a washer 48, and a nut 49.

The speaker of the second embodiment comprises the speaker magnet 43 comprising the glassy alloy sintered compact, and thus has substantially the same effect as the speaker of the first embodiment.

EXAMPLES

Production Example 1

Single pure metals of Fe, Co, Nd, Cr and Zr and a pure boron crystals were mixed in an Ar gas atmosphere, and melted by an arc to produce a master alloy.

Next, the master alloy was melted in a crucible, and then quenched by the single roll method in which the melt was sprayed, at an injection pressure of 0.50 kgf/cm$^2$, onto a copper roll rotating at a rate of 4000 rpm through a nozzle having a diameter of 0.35 to 0.45 mm formed at the lower end of the crucible in an argon gas atmosphere at 60 cmHg to produce metal alloy ribbon samples having a width of 0.4 to 1 mm and a thickness of 20 to 30 $\mu$m. In the single roll liquid quenching apparatus used, the surface of the single roll was finished to #1500. The gap between the single roll and the nozzle tip was 0.30 mm.

The obtained samples were analyzed by X-ray diffraction and differential scanning calorimetry (DSC), observed on a transmission electronic microscope (TEM), and measured with respect to magnetic properties at room temperature and 15 kOe by a vibrating sample type magnetometer (VSM).

Figure 13:
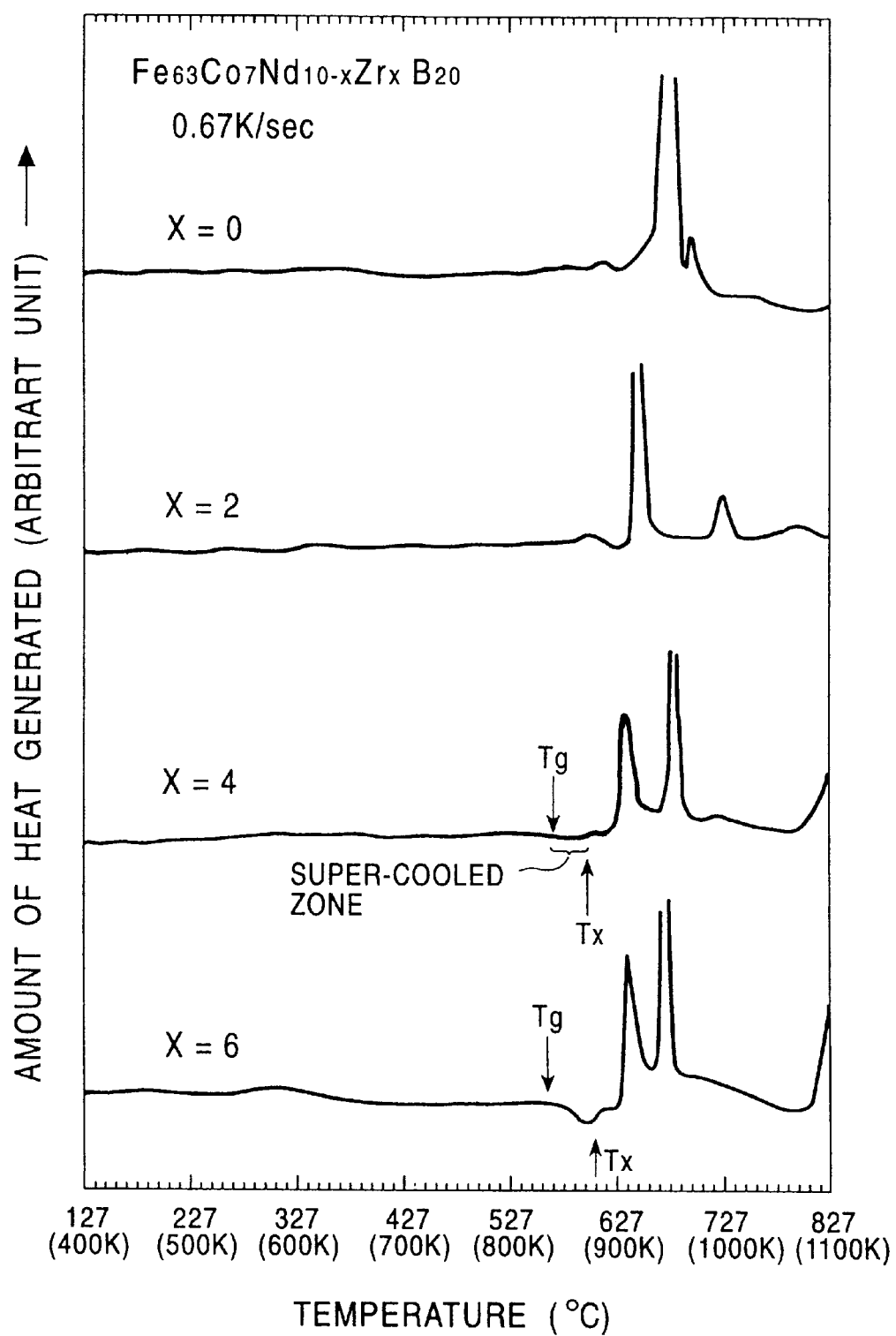
FIG. 13 is a diagram showing the results of measurement of DSC curves of ribbon samples having the composition Fe$_{63}$Co$_7$Nd$_{10-z}$Zr$_x$B$_{20}$ (x=0, 2, 4 and 6 atomic %) after quenching in a single roll production method.

FIG. 13 shows the results of measurement of DSC curves of samples having the composition $Fe_{63}Co_7Nd_{10-x}Zr_xB_{20}$(x= 0, 2, 4 and 6) when heated in the range of 127 to 827° C. at a rate of temperature rise of 0.67° C./sec.

FIG. 13 indicates that in the sample having the composition $Fe_{63}Co_7Nd_{10}B_{20}$, at least three exothermic peaks are observed, and thus crystallization possibly takes place in at least three steps. It is also found that the glass transition temperature Tg is observed below the crystallization temperature Tx, but with an amount of Zr added of 4 atomic % or more, endothermic reaction possibly corresponding to Tg is observed at a temperature below Tg.

Figure 14:
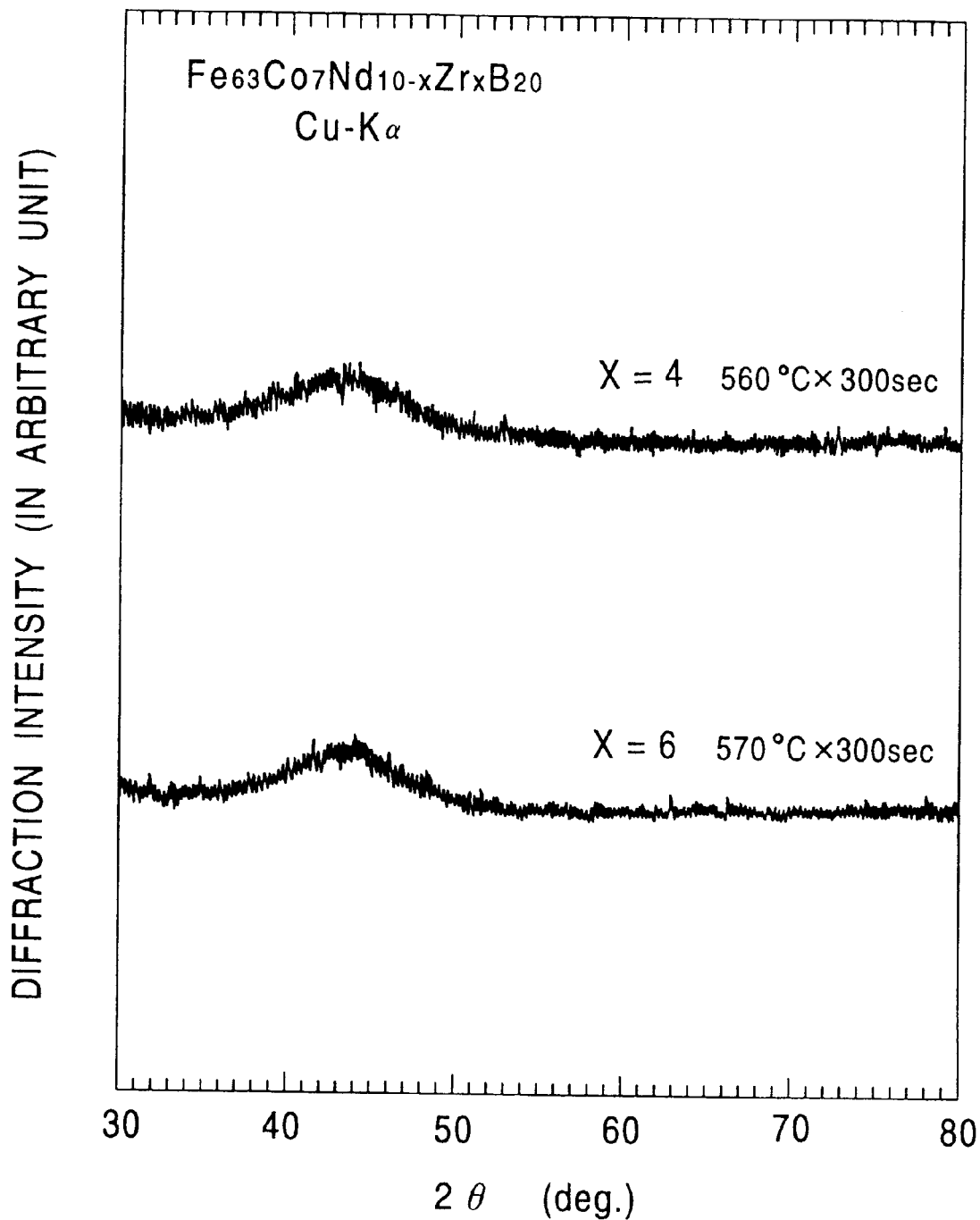
FIG. 14 is a chart showing the result of X-ray diffraction analysis of a ribbon sample having the composition Fe$_{63}$Co$_7$Nd$_6$Zr$_4$B$_{20}$ after annealing at 560° C. (833 K) for 300 seconds, and a ribbon sample having the composition Fe$_{63}$Co$_7$Nd$_4$Zr$_6$B$_{20}$ after annealing at 570° C. (843 K) for 300 seconds.

FIG. 14 is a chart showing the result of X-ray diffraction analysis of the glassy alloy ribbon sample having the composition $Fe_{63}Co_7Nd_6Zr_4B_{20}$ shown in FIG. 13 after annealing at 560° C. (833 K) for 300 seconds immediately after the temperature of endothermic reaction, and the result of X-ray diffraction analysis of the glassy alloy ribbon sample having the composition $Fe_{63}Co_7Nd_4Zr_6B_{20}$ shown in FIG. 13 after annealing at 570° C. (843 K) for 300 seconds immediately after the temperature of endothermic reaction.

FIG. 14 reveals that in both glassy alloy ribbon samples respectively having the compositions $Fe_{63}Co_7Nd_6Zr_4B_{20}$ and $Fe_{63}Co_7Nd_4Zr_6B_{20}$, no diffraction peak corresponding to crystallization is observed, and only a broad peak is observed near 2θ=45°. It is thus found that endothermic reaction observed below the crystallization temperature Tx is endothermic reaction corresponding to glass transition.

This indicates that at a Zr content of 4 atomic %, the temperature width ΔTx (=Tx−Tg) of the supercooled liquid region is ΔTx=30 K, and at a Zr content of 6 atomic %, the temperature width ΔTx is ΔTx=35 K, and that the higher the Zr content is, the wider the temperature width ΔTx of the supercooled liquid region is.

Figure 15:
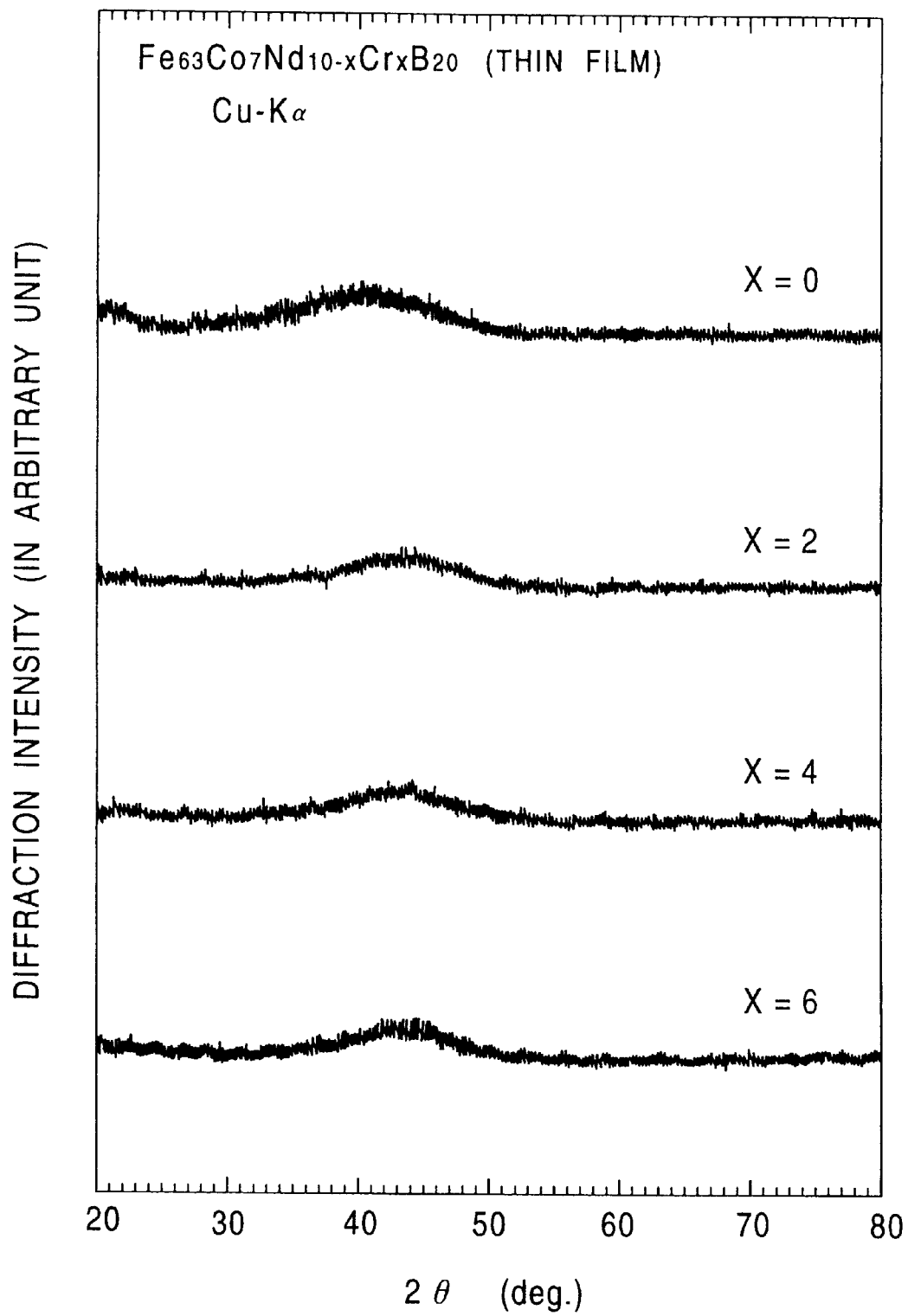
FIG. 15 is a chart showing X-ray diffraction images of examples of glassy alloys used as sintering raw material.

FIG. 15 is a X-ray diffraction chart of glassy alloy ribbon samples having the compositions $Fe_{63}Co_7Nd_8Cr_2B_{20}$, $Fe_{63}Co_7Nd_6Cr_4B_{20}$ and $Fe_{63}Co_1Nd_4Cr_6B_{20}$. As a comparative example, a glassy alloy ribbon sample of $Fe_{63}Co_7Nd_{10}B_{20}$ (containing no metal M) prepared by the same method as described above was also subjected to X-ray diffraction analysis. X-ray diffraction analysis was carried out by using an X-ray diffractometer (XRD) using Cu-Kα rays.

Figure 16:
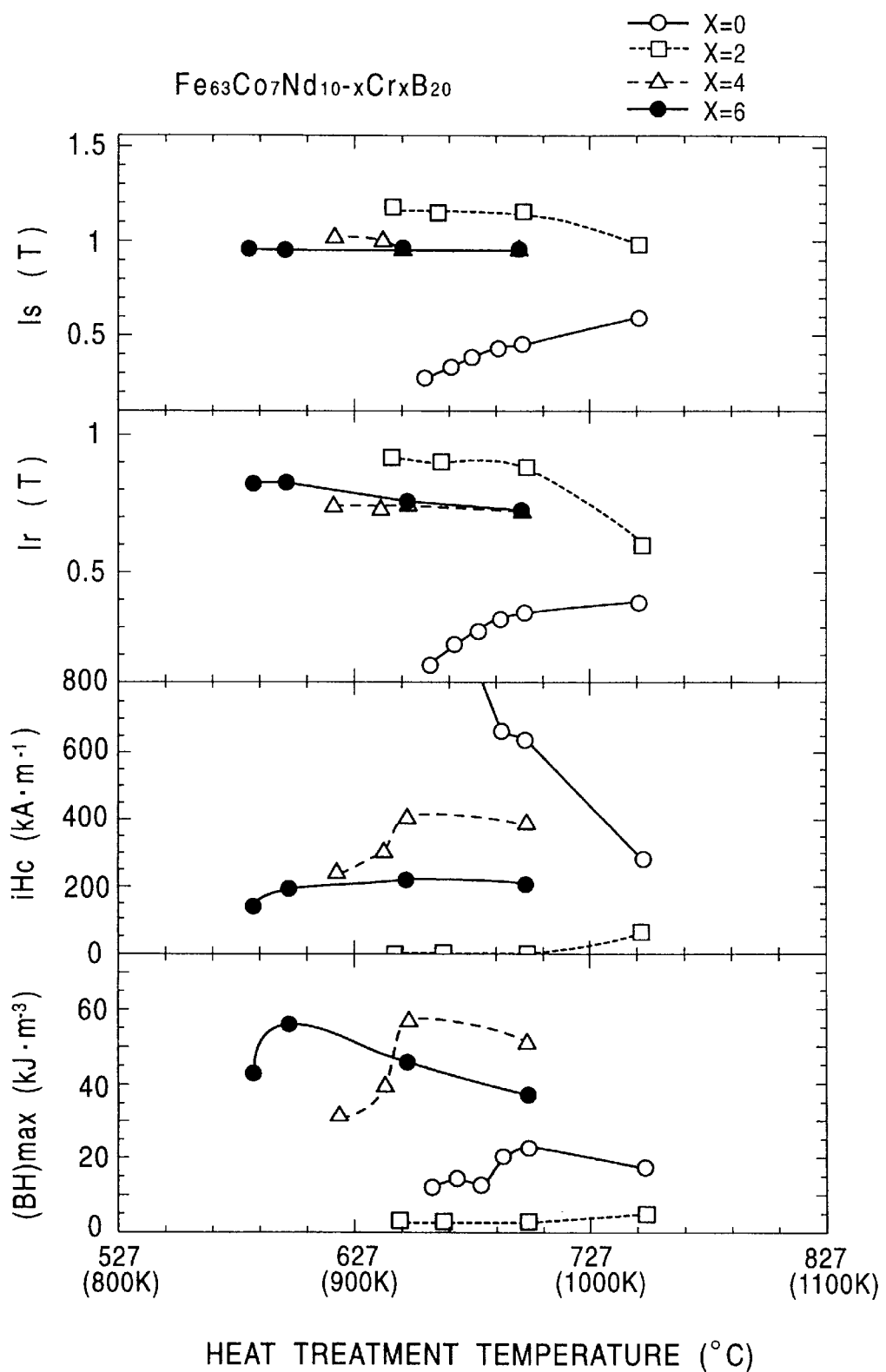
FIG. 16 is a graph showing the dependence of magnetic properties on the heat treatment temperature with respect to ribbon samples having the composition Fe$_{63}$Co$_7$Nd$_{10-z}$Cr$_x$B$_{20}$ (x=0, 2, 4 and 6 atomic %) after heat treatment at 560 to 900° C. for a holding time of 300 seconds.

The results shown in FIG. 16 reveal that all patterns obtained are typical broad patterns, and thus all samples are amorphous.

Next, samples having the composition $Fe_{63}Co_7Nd_{10-x}Cr_xB_{20}$ (x=0, 2, 4 and 6) were sealed in a vacuum, and then subjected to heat treatment at 560° C. (833 K) to 900° C. (1173 K) for a holding time of 300 seconds by using a muffle furnace to measure the dependence of magnetic properties on the heat treatment temperature. FIG. 16 shows the results of measurement.

The results shown in FIG. 16 indicate that in the samples (x=2, 4 and 6) containing Cr, the value of saturation magnetization is as high as 1 T or more, which is higher than the comparative sample (x=0) containing no Cr. All samples show the tendency that remanent magnetization increases as the heat treatment temperature increases. The samples (x=2, 4 and 6) containing Cr show a large increase in remanent magnetization to about 0.8 T, and a high remanence ratio, as compared with the comparative sample (x=0) containing no Cr. The samples (x=2, 4 and 6) containing Cr exhibit lower coercive force than the comparative sample (x=0) containing no Cr regardless of the amount of Cr added and the heat treatment temperature, but the sample of x=4 shows a high maximum energy product.

Figure 17:
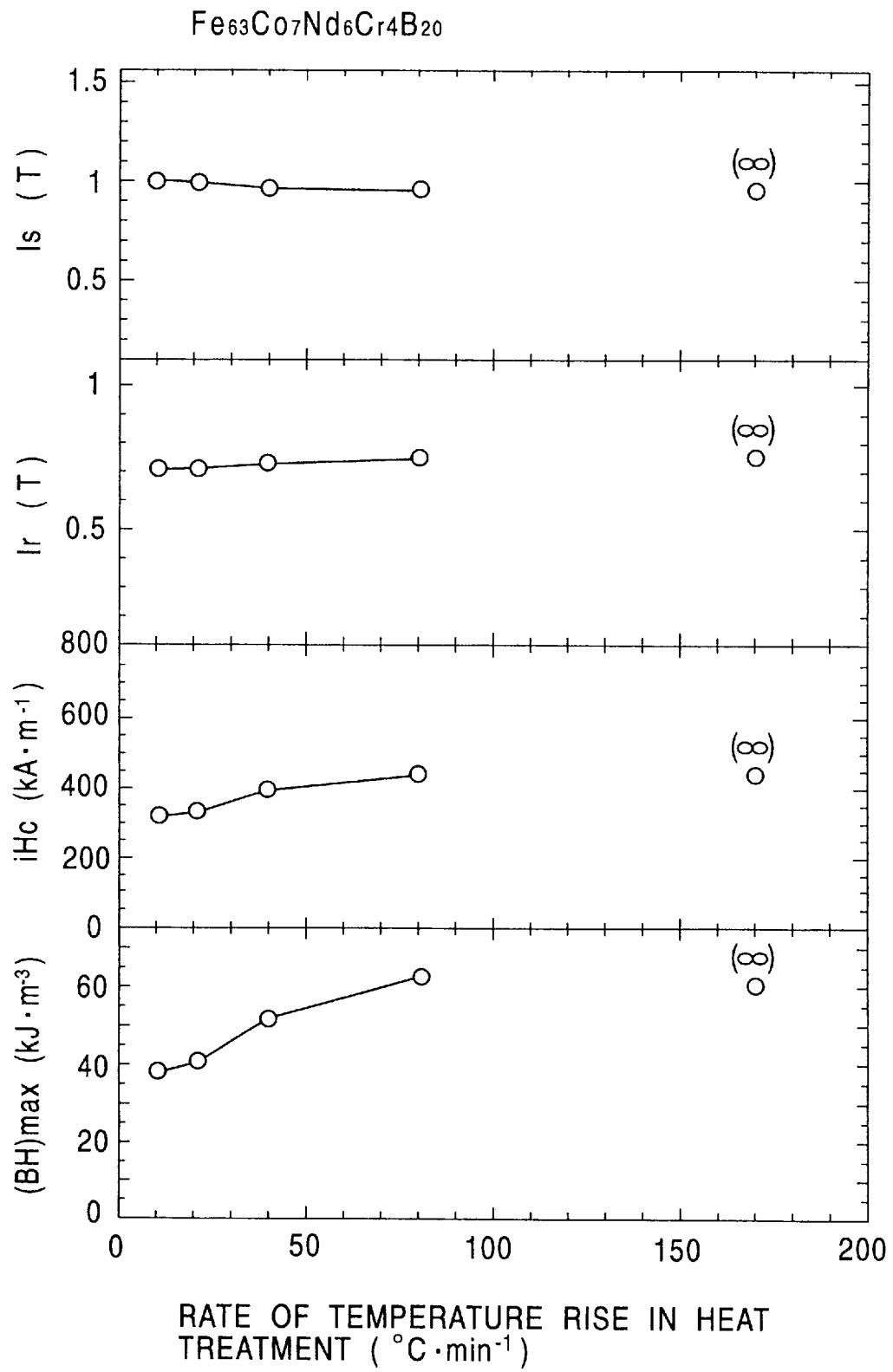
FIG. 17 is a graph showing the dependence of magnetic properties on the heat treatment temperature with respect to a ribbon sample having the composition Fe$_{63}$Co$_7$Nd$_6$Cr$_4$B$_{20}$ after heat treatment.

Next, a sample having the composition $Fe_{63}Co_7Nd_6Cr_4B_{20}$ was sealed in a vacuum, and then subjected to heat treatment at 650° C. (923 K) for a holding time of 300 seconds at a heating rate of 10° C./min or more by using a muffle furnace to measure the dependence of magnetic properties on heating rate. The results of measurement are shown in FIG. 17 and Table 1.

Table 1 also shows the density of a glassy alloy ribbon sample after quenching in production by the single roll method.

TABLE 1

Dependence of magnetic properties of $Fe_{63}Co_7Nd_6Cr_4B_{20}$ on rate of heating rate

| a (° C./min) | Is (T) | Ir (T) | Ir/Is | iHc (kA/m) | $(BH)_{max}$ (kJ/m$^3$) | Density ($10^3$ kg/m$^3$) |
|---|---|---|---|---|---|---|
| as-Q | 0.904 | 0.079 | 0.088 | — | — | 6.774 |
| 10 | 1.005 | 0.713 | 0.709 | 321.97 | 39.63 | |
| 20 | 1.008 | 0.722 | 0.716 | 340.03 | 42.46 | |
| 40 | 0.986 | 0.738 | 0.748 | 399.08 | 53.83 | |
| 80 | 0.985 | 0.757 | 0.769 | 453.67 | 64.48 | |
| ∞ | 0.989 | 0.740 | 0.748 | 410.06 | 56.98 | |

In Table 1, as-Q represents the alloy ribbon sample after quenching without heat treatment, a represents the rate of temperature rise in heat treatment, m represents the maximum of the heating rate, Is represents saturation magnetization, Ir represents remanent magnetization, Ir/Is represents remanence ratio, iHc represents coercive force, and $(BH)_{max}$ represents the maximum magnetic energy product.

Figure 18:
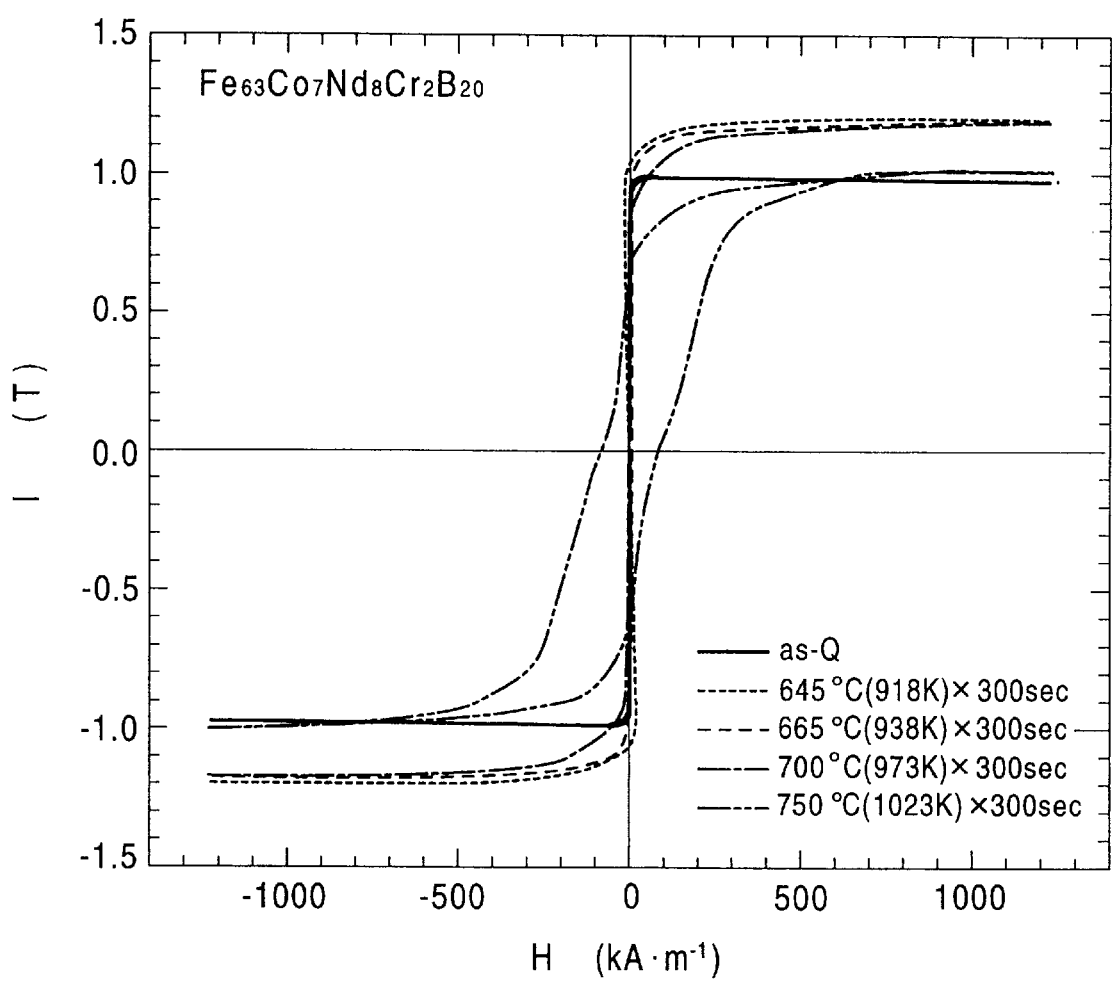
FIG. 18 is a graph showing the I-H loops of a ribbon sample having the composition Fe$_{63}$Co$_7$Nd$_8$Cr$_2$B$_{20}$ before and after heat treatment.
Figure 19:
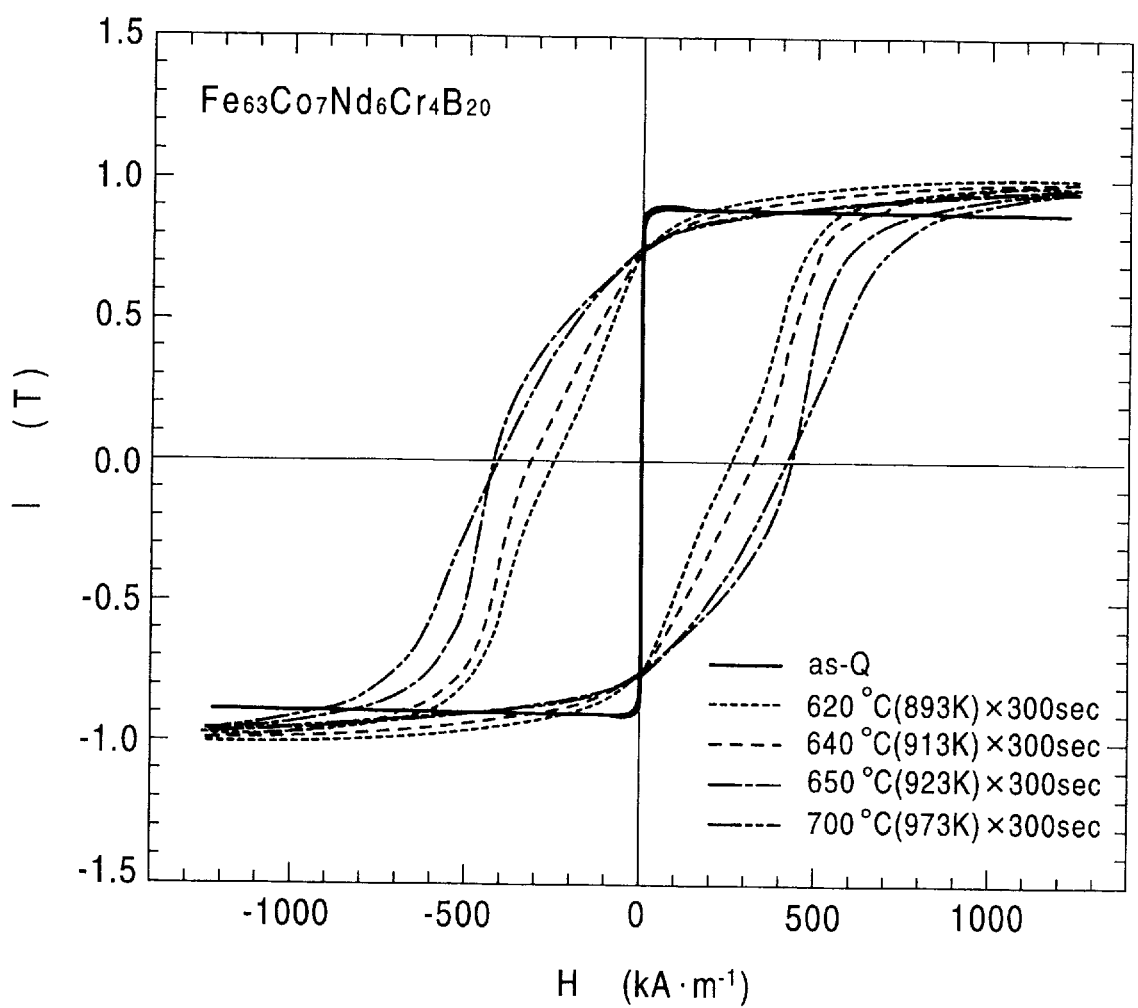
FIG. 19 is a graph showing the I-H loops of a ribbon sample having the composition Fe$_{63}$Co$_7$Nd$_6$Cr$_4$B$_{20}$ before and after heat treatment.
Figure 20:
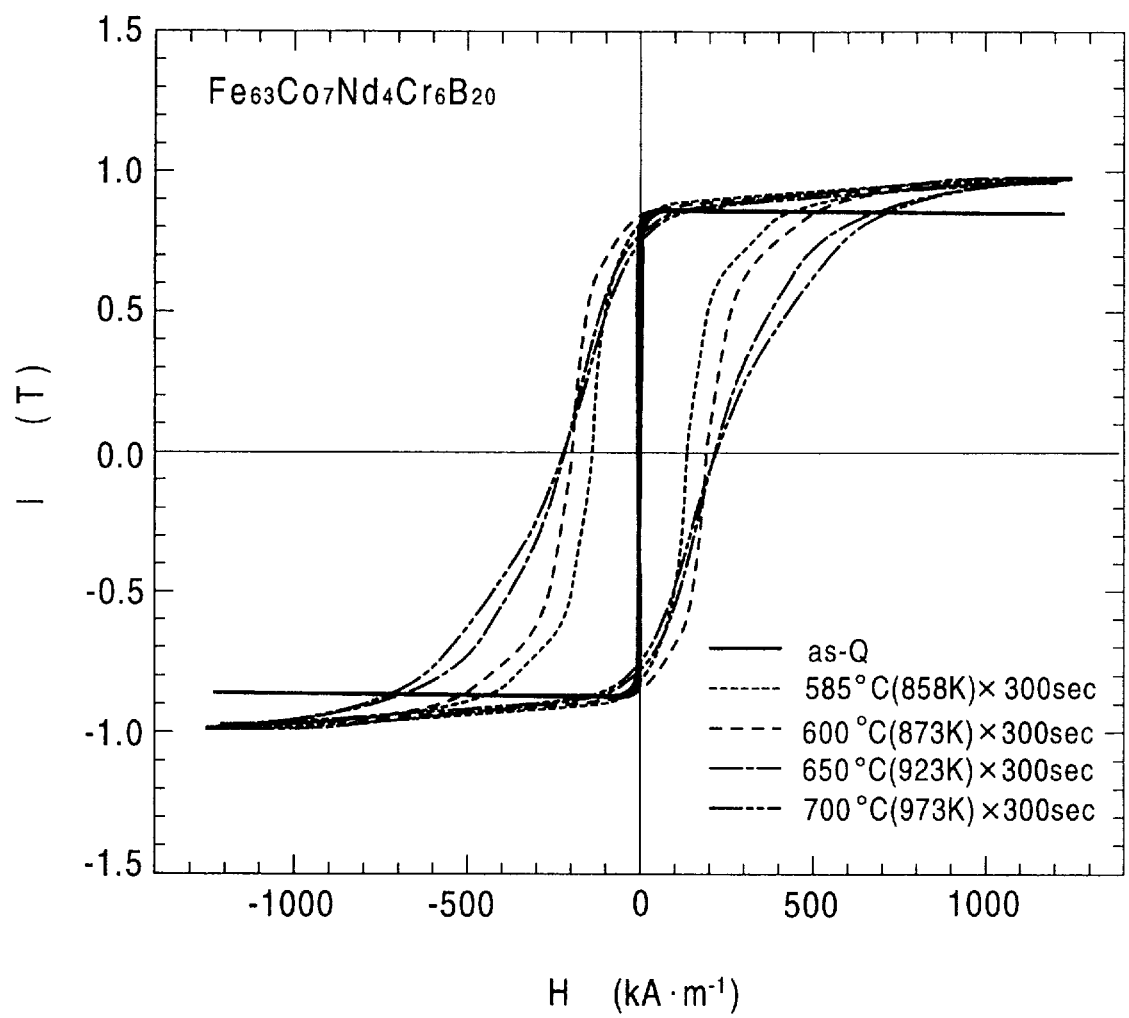
FIG. 20 is a graph showing the I-H loops of a ribbon sample having the composition Fe$_{63}$Co$_7$Nd$_4$Cr$_6$B$_{20}$ before and after heat treatment.

The results shown in FIG. 17 and Table 1 reveal that in heat treatment of the glassy alloy ribbon sample having the composition $Fe_{63}Co_7Nd_6Cr_4B_{20}$, at a heating rate of 20° C./min or more, saturation magnetization and remanent magnetization hardly change, but coercive force and maximum magnetic energy product tend to increase, at a heating rate of 40° C./min or more, a coercive force of about 400 kA/m and a maximum magnetic energy product of 54 kJ/m$^3$ are obtained, and at a rate of temperature rise of 80° C./min or more, a coercive force of about 450 kA/m and a maximum magnetic energy product of 65 kJ/m$^3$ are obtained. At a heating rate close to 80° C./min or more, coercive force and maximum magnetic energy product are maximum, and the magnetic properties adversely deteriorate even if the heating rate is increased to 80° C./min or more. Therefore, for the glassy alloy having the above composition, the upper limit of the heating rate temperature rise is possibly about 80° C./min. FIGS. 18 to 20 show I-H loops before and after heat treatment with respect to glassy alloy ribbon samples respectively having the compositions $Fe_{63}Co_7Nd_8Cr_2B_{20}$, $Fe_{63}Co_7Nd_6Cr_4B_{20}$ and $Fe_{63}Co_7Nd_4Cr_6B_{20}$.

Figure 21:
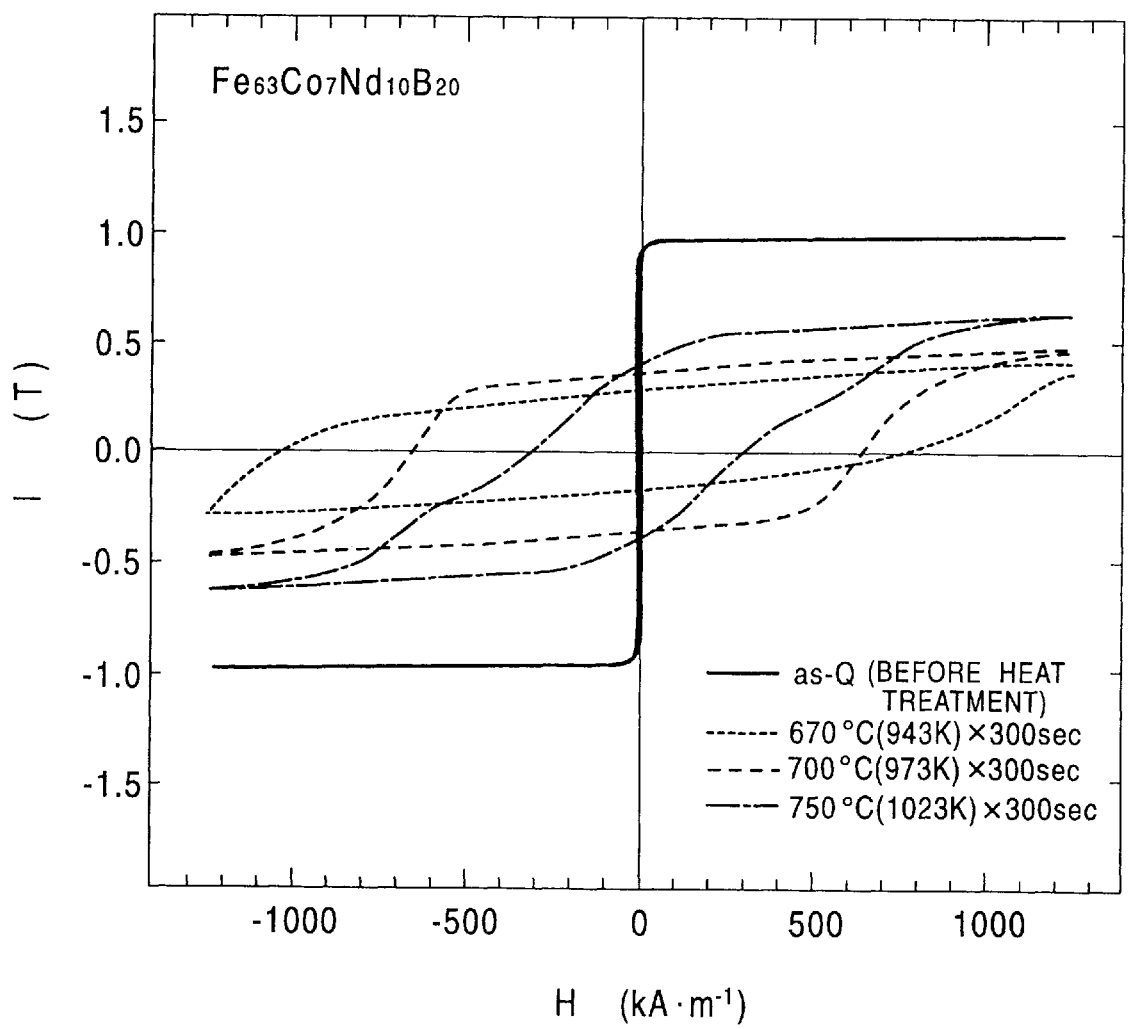
FIG. 21 is a graph showing the I-H loops of a ribbon sample having the composition Fe$_{63}$Co$_7$Nd$_{10}$B$_{20}$ before and after heat treatment.

FIG. 21 shows a I-H loop before and after heat treatment with respect to a comparative sample having the composition $Fe_{63}Co_7Nd_{10}B_{20}$.

FIGS. 18 to 20 indicate that the amorphous alloy ribbon sample as a comparative example having the composition $Fe_{63}Co_7Nd_{10}B_{20}$ after quenching without heat treatment shows soft magnetism, and hard magnetism is exhibited after crystallization heat treatment. It is also found that since the deposited phase is very fine in the early stage of crystallization, and as the heat treatment temperature increases, the coercive force decreases, and the remanence ratio deteriorates. This indicates that grain growth of each deposited phase, particularly the soft magnetic phase, occurs with an increase in the heat treatment temperature. On the other hand, the glassy alloy ribbon sample containing 2 to 6 atomic % of Cr as each of examples after quenching without heat treatment shows soft magnetism, and hard magnetic is exhibited after crystallization heat treatment. It is also found that in the examples, saturation magnetization and remanent magnetization are very high, and coercive force increases in the early stage of crystallization, becomes maximum after first crystallization, and then slightly decreases. This indicates that the maximum energy product is higher than the comparative example, and that the glassy alloy ribbon sample of each of the examples can be used as an exchange spring magnet comprising the soft magnetic phase and the hard magnetic phase.

Production Example 2

Single pure metals of Fe, Co, Nd and Cr and pure boron crystals were mixed in an Ar gas atmosphere and melted by an arc to produce a master alloy.

The master alloy was melted in a crucible, and then quenched by the same single roll method as Production Example 1 to produce glassy alloy ribbon samples having a width of 0.4 to 1 mm and a thickness of 20 to 30 μm. The thus-obtained samples were analyzed by X-ray diffraction and differential scanning calorimetry (DSC), observed on a transmission type electron microscope (TEM) and measured with respect to magnetic properties by a vibrating sample type magnetometer (VSM) at room temperature and 15 kOe.

Next, the produced glassy alloy ribbon samples having the composition $Fe_{63}Co_7Nd_{10-x}Cr_xB_{20}$ (x=0, 2, 4 and 6) were sealed in a vacuum, and then subjected to heat treatment at 585° C. (858 K) to 750° C. (1023 K) for a holding time of 300 seconds by using a muffle furnace to measure the dependence of magnetic properties on the heat treatment temperature. Table 2 shows the results of measurement.

Table 2 also shows the density of a glassy alloy ribbon sample having each of the compositions after quenching in production by the sample roll method.

TABLE 2

Magnetic properties of $Fe_{63}Co_7Nd_{10-x}Cr_xB_{20}$

| | Heat treatment temperature | Is (T) | Ir (T) | Ir/Is | iHc (KA/m) | $(BH)_{max}$ $(kJ/m^3)$ | Density $(10^3\ kg/m^3)$ |
|---|---|---|---|---|---|---|---|
| $Fe_{63}Co_7Nd_{10}B_{20}$ | as-Q | 0.964 | 0.064 | 0.066 | 49.66 | 0.08 | 6.510 |
| | 660 | 0.287 | 0.169 | 0.588 | 1051.22 | 11.73 | |
| | 670 | 0.349 | 0.232 | 0.664 | 1037.69 | 14.32 | |
| | 680 | 0.408 | 0.296 | 0.725 | 848.30 | 13.01 | |
| | 690 | 0.459 | 0.341 | 0.743 | 663.91 | 21.00 | |
| | 700 | 0.477 | 0.358 | 0.750 | 633.91 | 22.99 | |
| | 750 | 0.630 | 0.401 | 0.637 | 289.10 | 17.71 | |
| $Fe_{63}Co_7Nd_8Cr_2B_{20}$ | as-Q | 0.933 | 0.083 | 0.084 | — | — | 6.771 |
| | 645 | 1.194 | 0.931 | 0.780 | 5.51 | 2.93 | |
| | 665 | 1.177 | 0.908 | 0.772 | 6.22 | 3.34 | |
| | 700 | 1.180 | 0.893 | 0.757 | 7.12 | 3.80 | |
| | 750 | 1.028 | 0.613 | 0.596 | 7.52 | 5.98 | |
| $Fe_{63}Co_7Nd_6Cr_4B_{20}$ | as-Q | 0.904 | 0.079 | 0.088 | — | — | 6.774 |
| | 620 | 1.038 | 0.742 | 0.715 | 242.63 | 31.00 | |
| | 640 | 1.018 | 0.737 | 0.723 | 307.17 | 39.09 | |
| | 650 | 0.989 | 0.740 | 0.748 | 410.06 | 56.98 | |
| | 700 | 0.976 | 0.727 | 0.745 | 394.70 | 51.36 | |
| $Fe_{63}Co_7Nd_4Cr_6B_{20}$ | as-Q | 0.864 | 0.069 | 0.080 | — | — | 6.777 |
| | 585 | 0.979 | 0.825 | 0.843 | 144.99 | 42.84 | |
| | 600 | 0.964 | 0.818 | 0.848 | 197.11 | 56.23 | |
| | 650 | 0.969 | 0.763 | 0.788 | 224.17 | 46.04 | |

In Table 2, as-Q represents an alloy ribbon sample after quenching without heat treatment, Ta represents the heat treatment temperature, Is represents saturation magnetization, Ir represents remanent magnetization, Ir/Is represents remanence ratio, iHc represents coercive force, and $(BH)_{max}$ represents the maximum magnetic energy product.

The results shown in Table 2 indicate that in the example samples containing Cr, the value of saturation magnetization is as high as 1 T or more, which is higher than the comparative sample not containing Cr. The samples containing Cr show a large increase in remanent magnetization to about 0.6 to 0.9 T, and a high remanence ratio, as compared with the comparative sample not containing Cr.

Next, the sample having each of the compositions shown in Table 2 was heated in the range of 127 to 827° C. at a heating rate of 0.67° C./sec to examine the temperature width ΔTx of the supercooled liquid region from a DSC curve. As a result, in the amorphous alloy ribbon sample of a comparative example having the composition $Fe_{63}Co_7Nd_{10}B_{20}$, ΔTx is not observed, while the glassy alloy ribbon samples having the compositions $Fe_{63}Co_7Nd_8Cr_2B_{20}$ $Fe_{63}Co_7Nd_6Cr_4B_{20}$, $Fe_{63}Co_7Nd_4Cr_6B_{20}$ and $Fe_{63}Co_7Nd_4Zr_6B_{20}$ exhibit ΔTx of 51° C., 40° C., 52° C., and 25° C., respectively. It is thus found that a sample containing Cr exhibits a supercooled liquid region having a wider temperature width ΔTx.

Production Example 3

Description will be made of an example of production of the hard magnetic alloy sintered compact of the present invention.

An amorphous glassy alloy having each of the compositions shown in Table 3 was prepared. First, an alloy ingot having each of the compositions was prepared by an arc melting method, and then the resultant melt was sprayed on a rotating Cu roll in an Ar atmosphere to obtain a quenched ribbon having a thickness of about 20 μm. The thus-obtained quenched ribbon was ground by suing a rotor speed mill to produce an amorphous glassy alloy powder having a particle size of 50 to 150 μm.

A sintered compact was formed by the spark plasma sintering apparatus shown in FIG. 1 using each of the obtained various glassy alloy powders by the method described below. The inside of a WC die was filled with about 2 g of each glassy alloy powder by using a hand press, and inserted into the die 1 of the spark plasma sintering apparatus shown in FIG. 1. The inside of the chamber was pressurized by the upper and lower punches 2 and 3 in an atmosphere of x $10^{-5}$ torr, and at the same time, a pulse current was applied to the raw powder from the current carrying device to heat the powder. The pulse waveform comprised 12 pulses conducted and 2 pulses in a quiescent time, as shown in FIG. 2 so that the raw powder was heated at a current of 4700 to 4800 A at maximum.

Sintering was carried out by heating a sample from room temperature to the sintering temperature Ts (*C) shown in Table 3 with the pressure Ps (MPa) shown in Table 3 applied to the sample, and holding the sample at this temperature for about 5 minutes. The heating rate was 100° C./min.

Each of the obtained sintered compacts was measured with respect to magnetic properties including saturation magnetization Is (T), remanent magnetization Ir (T), remanence ratio Ir/Is, coercive force iHc (kOe), and maximum energy product $(BH)_{max}$ $(kJ/m^3)$, and the relative density (%).

In regard to the magnetic properties, properties in the three axis directions X, Y and Z wherein the Z axis is the direction of application of sintering pressure Ps in sintering, and the X and Y axes are perpendicular to the Z axis. The remanent magnetization Ir (T) is a value represented by the following equation:

Ir (T)=4π×7.0×relative density×Ir (emu/g)/10000 The relative density (%) is a value relative to the true density (about 7.0 g/cm$^3$). The results are shown in Table 3.

TABLE 3

| Alloy composition and sintering condition | Direction | Is (T) | Ir (T) | iHc (kA/m) | (BH)max (kJm$^{-3}$) | Ir/Is | Relative Density (%) |
|---|---|---|---|---|---|---|---|
| $Fe_{63}Co_7Nd_8Cr_2B_{20}$ | X | 1.03 | 0.61 | 77.5 | 6.0 | 0.59 | 93 |
| Ts = 750° C. | Y | 1.03 | 0.61 | 77.5 | 6.0 | 0.59 | |
| Ps = 633 MPa | Z | 1.20 | 0.88 | 93.0 | 7.2 | 0.73 | |
| $Fe_{63}Co_7Nd_6Cr_4B_{20}$ | X | 0.99 | 0.74 | 410 | 60 | 0.75 | 94 |
| Ts = 650° C. | Y | 0.99 | 0.74 | 410 | 60 | 0.75 | |
| Ps = 633 MPa | Z | 1.19 | 1.07 | 490 | 72 | 0.90 | |
| $Fe_{63}Co_7Nd_4Cr_6B_{20}$ | X | 0.97 | 0.76 | 224 | 46 | 0.78 | 94 |
| Ts = 600° C. | Y | 0.97 | 0.76 | 224 | 46 | 0.78 | |
| Ps = 633 MPa | Z | 1.15 | 1.09 | 269 | 55 | 0.94 | |

Ts = sintering temperature
Ps = sintering pressure

The results shown in Table 3 indicate that all sintered compacts obtained by the spark plasma sintering method using the alloy compositions shown in Table 3 have excellent hard magnetic properties. It is also found that in all samples, Is, Ir and Ir/Is are relatively high in the Z direction, and $(BH)_{max}$ is high. This indicates that the hard magnetic phase crystallized or experienced grain growth by sintering under stress is made anisotropic, thereby imparting magnetic anisotropy.

Figure 22:
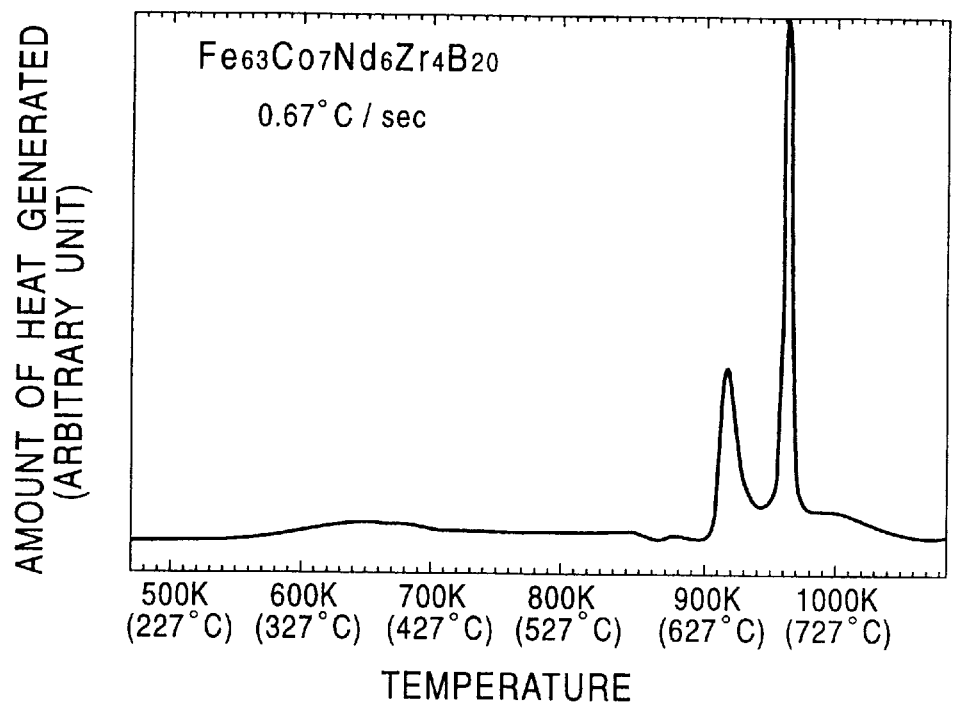
FIG. 22 is a chart showing a DSC curve of a glassy alloy thin ribbon sample having the composition Fe$_{63}$Co$_7$Nd$_6$Cr$_4$B$_{20}$.

Next, for a glassy alloy ribbon sample having the composition $Fe_{63}Co_7Nd_6Zr_4B_{20}$, the relation between the heating temperature (° C.) and the amount of heat generated was examined. The results of measurement are shown in FIG. 22. FIG. 22 shows a DSC curve of a glassy alloy ribbon sample having the composition $Fe_{63}Co_7Nd_6Zr_4B_{20}$.

Figure 23:
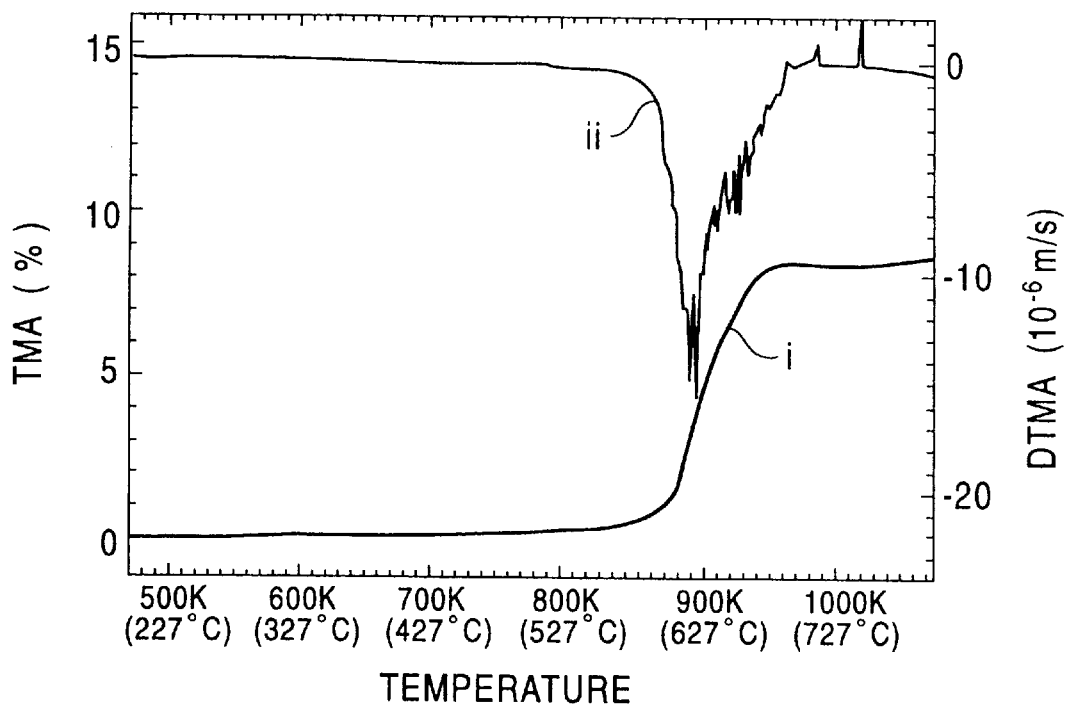
FIG. 23 is a chart showing a TMA curve and a DTMA curve of a glassy alloy thin ribbon sample having the composition Fe$_{63}$Co$_7$Nd$_6$Cr$_4$B$_{20}$.

For a glassy alloy ribbon sample having the composition $Fe_{63}Co_7Nd_6Zr_4B_{20}$, the relation between the heating temperature (° C.) and the elongation percentage was also examined. The results of measurement are shown in FIG. 23. In FIG. 23, curves (i) and (ii) are a thermal mechanical analysis (TMA) curve and a delta thermal mechanical analysis (DTMA) curve, respectively, of the glassy alloy ribbon sample having the composition $Fe_{63}Co_7Nd_6Zr_4B_{20}$.

In FIGS. 22 and 23, the DSC curve shows exothermic peaks at about 647° C. and 687° C., the DTMA curve indicates that the absolute differential value is high at about 627° C. and the sample is easily elongated at about 627° C., and the TMA curve indicates that the sample is rapidly elongated with an increase in temperature in the region of 577° C. to 677° C. This indicates that softening of the alloy takes place in the supercooled liquid region. Therefore, it is possible to obtain a sintered compact with a high density by solidification molding which employs such softening of an amorphous alloy, and obtain a sintered compact having excellent hard magnetic properties such as remanent magnetization (Ir), coercive force (iHc), maximum magnetic energy product $((BH)_{max})$, etc.

As described above, the hard magnetic glassy alloy of this embodiment has a high density and good hard magnetic properties such as remanent magnetization (Ir), coercive force (iHc), maximum magnetic energy product $((BH)_{max})$, etc. Therefore, by using such a hard magnetic glassy alloy for the stepping motor, it is possible to miniaturize the stepping motor and increase the rotational torque.

The technical field of the present invention is not limited to the above embodiments, various changes can be made in the scope of the gist of the present invention.

Although, in the above embodiments, the present invention is applied to the hybrid stepping motor, the present invention can also be applied to a permanent magnet type stepping motor. Although the above embodiments relate to the rotation type motor, the present invention can also be applied to a linear motor.

Production Example 4

Description will be made of an example in which the hard magnetic ally of the present invention was cast.

Single pure metals of Fe, Co, Nd and Cr, and pure boron crystals were mixed in an Ar gas atmosphere, and then melted by an arc to produce a master alloy having the following composition:

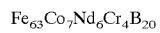

Next, the master alloy was ground, and 5 g of the powder was put in the crucible 15 of the casting apparatus shown in FIG. 4. A current was passed through the high-frequency coil 14 to melt the master alloy by heating at a temperature 100 to 200° C. higher than the melting point of the master alloy in an inert gas atmosphere. The thus-obtained melt 16 was injected into the casting mold 17 having the casting cavity 18 of Ø1 mm×50 mm formed therein, at an injection pressure of 0.5 to 1.5 kgf/cm$^2$ through the nozzle 15a having a pore diameter of 0.5 to 0.6 mm and provided at the bottom of the crucible to obtain a solidified molding of Ø1 mm×50 mm.

Figure 24:
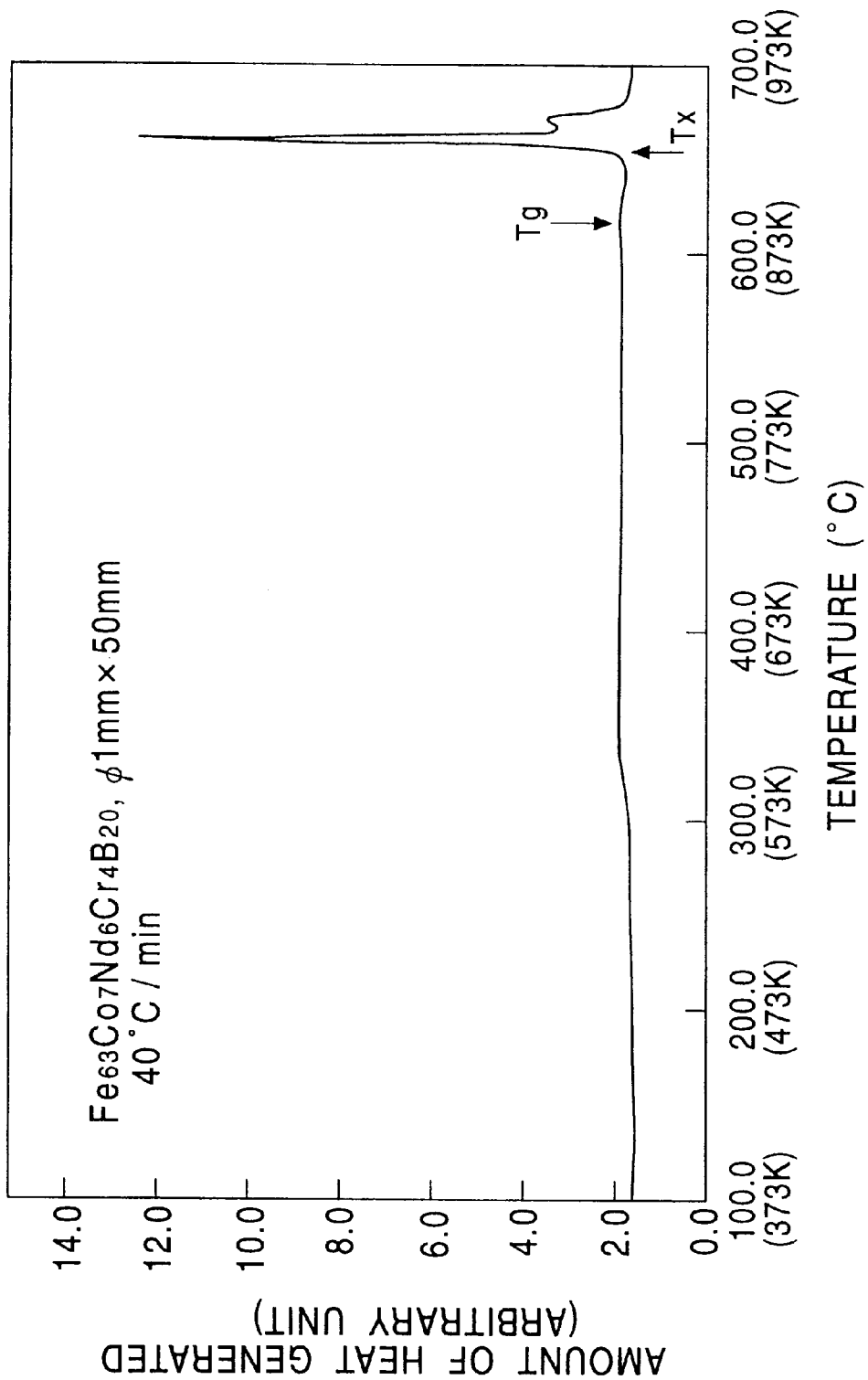
FIG. 24 is a graph showing a DSC curve of a glassy alloy solidified product having the composition Fe$_{63}$Co$_7$Nd$_6$Cr$_4$B$_{20}$.

The thus-obtained molding was measured by X-ray diffraction analysis by using a X-ray diffractometer (XRD) using Cu-Kα rays. As a result, the pattern was a typical broad pattern, and thus it was confirmed that the molding comprises an amorphous phase. Also the results of DSC measurement shown in FIG. 24 show the following.
Crystallization temperature Tx=655° C.
Glass transition temperature Tg=614° C.
It was thus confirmed that the molding shows the following:
Supermodel liquid region ΔTx=41° C.

Next, the molding was sealed in a quartz tube under vacuum, and then subjected to heat treatment by an electric furnace under the following conditions:
Heating rate: 80° C./min.
Heat treatment temperature: 620 to 700° C. (893 to 973 K)
Holding time: 5 minutes
Cooling: water quenching
The molding was crystallized by heat treatment to obtain a cast magnet comprising a $Fe_3B$ phase as a soft magnetic phase and a $Nd_2Fe_{14}B$ phase as a hard magnetic phase, which were precipitated in an amorphous matrix. Table 4 shows the magnetic properties of the cast magnet.

TABLE 4

| Composition | Heat treatment temperature (° C.) | Is (T) | Ir (T) | Ir/Is | iHc (KA/m) | $(BH)_{max}$ (kJm$^3$) | Density (g/cm$^3$) |
|---|---|---|---|---|---|---|---|
| $Fe_{63}Co_7Nd_6Cr_4B_{20}$ | as-Q | 0.99 | 0.08 | 0.09 | — | — | 6.7 |
| | 620 | 1.04 | 0.74 | 0.72 | 243 | 31.0 | |
| | 640 | 1.02 | 0.74 | 0.72 | 307 | 39.1 | |
| | 650 | 0.99 | 0.74 | 0.75 | 410 | 57.0 | |
| | 700 | 0.98 | 0.73 | 0.75 | 395 | 51.4 | |

As described above in the embodiments, the glassy alloy composition can be formed in a molding having any desired shape, and heat treatment of the molding permits formation of a cast magnet having high performance and comprising the soft and hard magnetic fine crystalline phases which are precipitated in an amorphous matrix. By using the sintered magnet or the cast magnet as the core of a stepping motor and a speaker, it is possible to easily provide a stepping motor or a speaker having excellent properties.

What is claimed is:

1. A hard magnetic alloy having soft and hard magnetic phases, the hard magnetic alloy obtained by heat treatment of a glassy alloy at a heating rate of 20° C./min or more, wherein the glassy alloy contains Fe as a main component, at least one element R selected from the rare earth elements, the content of the at least one element R being no greater than 15 atomic %, at least one element M selected from Ti, Zr, Hf, V, Nb, Ta, Cr, Mo, W, and Cu, and B, and having a supercooled liquid region having a temperature width ΔTx of 20° C. or more, which is represented by the equation ΔTx=Tx−Tg, wherein Tx indicates the crystallization temperature, and Tg indicates a glass transition temperature.

2. A hard magnetic alloy according to claim 1, wherein a crystalline phase composed of one or both of an α-Fe phase and a $Fe_3B$ phase, and a crystalline phase composed of a $Nd_2Fe_{14}B$ phase are precipitated in the hard magnetic alloy.

3. A hard magnetic alloy according to claim 1 represented by the following composition formula:

$$Fe_{100-x-y-z-w}R_xM_yT_zB_w$$

wherein T is at least one element selected from Co and Ni, and the composition ratios x, y, z and w by atomic % satisfy 2 atomic %≦x≦15 atomic %, 2 atomic %≦y≦20 atomic %, 0≦z≦20 atomic %, and 10 atomic %≦w≦30 atomic %, respectively.

4. A hard magnetic alloy according to claim 3, wherein a crystalline phase composed of one or both of a α-Fe phase and a $Fe_3B$ phase, and a crystalline phase composed of a $Nd_2Fe_{14}B$ phase are precipitated in the hard magnetic alloy.

5. A hard magnetic alloy according to claim 1 represented by the following composition formula:

$$Fe_{100-x-y-z-w-t}R_xM_yT_zB_wL_t$$

wherein T is at least one element selected from Co and Ni, the composition ratios x, y, z, w and t by atomic % satisfy 2 atomic % ≦x≦15 atomic %, 2 atomic % ≦y≦20 atomic %, 0≦z≦20 atomic %, 10 atomic % ≦w≦30 atomic %, and 0≦t≦5 atomic %, respectively, and L is at least one element selected from Ru, Rh, Pd, Os, Ir, Pt, Al, Si, Ge, Ga, Sn, C and P.

6. A hard magnetic alloy according to claim 5, wherein a crystalline phase composed of one or both of a α-Fe phase and a $Fe_3B$ phase, and a crystalline phase composed of a $Nd_2Fe_{14}B$ phase are precipitated in the hard magnetic alloy.

7. A hard magnetic alloy having soft and hard magnetic phases, the hard magnetic alloy sintered compact obtained by sintering a glassy alloy powder under heat and pressure, wherein the glassy alloy powder contains Fe as a main component, at least one element R selected from the rare earth elements, the content of the at least one element R being no greater than 15 atomic %, at least one element M selected from Ti, Zr, Hf, V, Nb, Ta, Cr, Mo, W, and Cu, and B, and having a supercooled liquid region having a temperature width ΔTx of 20° C. or more, which is represented by the equation ΔTx=Tx−Tg, wherein Tx indicates the crystallization temperature, and Tg indicates a glass transition temperature.

8. A hard magnetic alloy sintered compact according to claim 7, wherein the glassy alloy has the composition represented by the following composition formula:

$$Fe_{100-x-y-z-w}R_xM_yT_zB_w$$

wherein R is the rare earth element, M is the metal M, T is at least one element selected from Co and Ni, and the composition ratios x, y, z and w by atomic % satisfy 2≦x≦15, 2≦y≦20, 0≦z≦20, and 10≦w≦30, respectively.

9. A hard magnetic alloy sintered compact according to claim 7, wherein the glassy alloy has the composition represented by the following composition formula:

$$Fe_{100-x-y-z-w-t}R_xM_yT_zB_wL_t$$

wherein R is the rare earth element, M is the metal M, T at least one element selected from Co and Ni, L is at least one element selected from Ru, Rh, Pd, Os, Ir, Pt, Al, Si, Ge, Ga, Sn, C and P, and the composition ratios x, y, z, w and t by atomic % satisfy 2≦x≦15, 2≦y≦20, 0≦z≦20, 10≦w≦30, and 0≦t≦5, respectively.

10. A cast magnet having soft and hard magnetic phases, the cast magnet obtained by casting a glassy alloy composition and then performing heat treatment, where the glassy alloy composition contains Fe as a main component, at least one element R selected from the rare earth elements, the content of the at least one element R being no greater than 15 atomic %, at least one element M selected from Ti, Zr, Hf, V, Nb, Ta, Cr, Mo, W, and Cu, and B, and having a supercooled liquid region having a temperature width ΔTx of 20° C. or more, which is represented by the equation ΔTx=Tx−Tg, wherein Tx indicates the crystallization temperature, and Tg indicates a glass transition temperature.

11. A cast magnet according to claim 10, wherein the glassy alloy has the composition represented by the following composition formula:

$$Fe_{100-x-y-z-w}R_xM_yT_zB_w$$

wherein R is the rare earth element, M is the metal M, T is at least one element selected from Co and Ni, and the composition ratios x, y, z and w by atomic % satisfy $2 \leq x \leq 15$, $2 \leq y \leq 20$, $0 \leq z \leq 20$, and $10 \leq w \leq 30$, respectively.

12. A cast magnet according to claim 10, wherein the glassy alloy has the composition represented by the following composition formula:

$$Fe_{100-x-y-z-w}R_xM_yT_zB_w$$

wherein R is the rare earth element, M is the metal M, T is at least one element selected from Co and Ni, L is at least one element selected from Ru, Rh, Pd, Os, Ir, Pt, Al, Si, Ge, Ga, Sn, C and P, and the composition ratios x, y, z, w and t by atomic % satisfy $2 \leq x \leq 15$, $2 \leq y \leq 20$, $0 \leq z \leq 20$, $10 \leq w \leq 30$, and $0 \leq t \leq 5$, respectively.

13. A hard magnetic alloy according to claim 1, wherein heat treatment of the glassy alloy is at a heating rate of 20° C./min or more and less than 80° C./min.

14. A hard magnetic alloy according to claim 13, wherein the glassy alloy has composition $Fe_{63}Co_7Nd_6Cr_4B_{20}$.

15. A hard magnetic alloy according to claim 1, wherein the hard magnetic alloy forms a rotor for a stepping motor.

16. A hard magnetic alloy according to claim 1, wherein the hard magnetic alloy forms a speaker magnet.

* * * * *

UNITED STATES PATENT AND TRADEMARK OFFICE
CERTIFICATE OF CORRECTION

PATENT NO. : 6,172,589 B1
DATED : January 9, 2001
INVENTOR(S) : Kouichi Fujita et al.

It is certified that error appears in the above-identified patent and that said Letters Patent is hereby corrected as shown below:

Title page,
ABSTRACT,
Line 2, change 20° C./min" to -- 20° C/min --.

Claim 1,
Line 3, change "20° C. /min" to -- 20° C/min --.
Line 10, change "20° C. or" to -- 20° C or --.

Claim 3,
Lines 6 and 7, change "$\leq$" to -- $\leq$ -- in all instances.

Claim 5,
Lines 6,7,8, change "$\leq$" to -- $\leq$ -- in all instances.

Claim 7,
Line 10, change "20° C. or" to -- 20° C or --.

Claim 8,
Line 8, change "$\leq$" to -- $\leq$ -- in all instances.

Claim 9,
Line 5, change "M, T at" to -- M, T is at --.
Lines 9 and 10, change "$\leq$" to -- $\leq$ -- in all instances.

Claim 10,
Line 10, change "20° C.or" to -- 20° C or --.

Claim 11,
Line 8, change "$\leq$" to -- $\leq$ -- in all instances.

UNITED STATES PATENT AND TRADEMARK OFFICE
CERTIFICATE OF CORRECTION

PATENT NO. : 6,172,589 B1
DATED : January 9, 2001
INVENTOR(S) : Kouichi Fujita et al.

It is certified that error appears in the above-identified patent and that said Letters Patent is hereby corrected as shown below:

Claim 12,
Lines 9 and 10, change "$\leq$" to -- $\leq$ -- in all instances.

Claim 13,
Line 3, Change "C./min" to -- C/min -- in both instances.

Signed and Sealed this

Fifth Day of February, 2002

Attest:

JAMES E. ROGAN
Attesting Officer
Director of the United States Patent and Trademark Office